(12) United States Patent
Li et al.

(10) Patent No.: US 8,112,108 B2
(45) Date of Patent: Feb. 7, 2012

(54) METHODS AND APPARATUS FACILITATING AND/OR MAKING WIRELESS RESOURCE REUSE DECISIONS

(75) Inventors: Junyi Li, Chester, NJ (US); Xinzhou Wu, Monmouth Junction, NJ (US); Saurabh Tavildar, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 521 days.

(21) Appl. No.: 12/336,638

(22) Filed: Dec. 17, 2008

(65) Prior Publication Data
US 2010/0151897 A1   Jun. 17, 2010

(51) Int. Cl.
*H04B 7/00* (2006.01)
(52) U.S. Cl. ........................................... 455/522
(58) Field of Classification Search .............. 455/522, 455/63.1, 67.11, 69
See application file for complete search history.

(56) References Cited

U.S. PATENT DOCUMENTS

| | | | |
|---|---|---|---|
| 6,978,151 B2 * | 12/2005 | Choi et al. | 455/522 |
| 7,184,703 B1 | 2/2007 | Naden et al. | |
| 7,769,406 B2 * | 8/2010 | Lin et al. | 455/522 |
| 7,787,899 B1 * | 8/2010 | Talley et al. | 455/522 |
| 7,894,846 B2 * | 2/2011 | Bennett | 455/522 |
| 2005/0239451 A1 | 10/2005 | Periyalwar et al. | |
| 2007/0093209 A1 | 4/2007 | Agrawal et al. | |
| 2007/0105576 A1 | 5/2007 | Gupta et al. | |
| 2008/0154585 A1 | 6/2008 | Yoshioka | |
| 2009/0036155 A1 | 2/2009 | Wu et al. | |

FOREIGN PATENT DOCUMENTS

| | | |
|---|---|---|
| WO | WO02091623 A1 | 11/2002 |
| WO | WO2007059448 | 5/2007 |
| WO | WO2008004609 | 1/2008 |
| WO | WO2008073737 | 6/2008 |
| WO | WO2008099785 | 8/2008 |

OTHER PUBLICATIONS

International Search Report and Written Opinion—PCT/US09/068600, International Searching Authority—European Patent Office, Mar. 17, 2010.

* cited by examiner

*Primary Examiner* — Brian Young
(74) *Attorney, Agent, or Firm* — James K. O'Hara

(57) ABSTRACT

Methods and apparatus related to reuse of a wireless resource are described. Various methods and apparatus are well suited to wireless communications systems lacking centralized control, e.g., an ad hoc peer to peer wireless communications system. A first wireless device of a first connection generates and transmits one or more control signals to be used by a wireless device of a second connection to make a resource reuse decision. The first connection is, e.g., an existing active connection and the second connection is, e.g., a potential connection. A transmission power level of a control signal is set based upon a predetermined relationship to at least one other signal previously communicated on the first connection, e.g., a peer discovery or paging signal. In some embodiments, the control signal is a single tone signal. The transmitted control signal facilitates the estimation of an expected SINR by a device of the second connection.

12 Claims, 20 Drawing Sheets

METHODS AND APPARATUS FACILITATING AND/OR MAKING WIRELESS RESOURCE REUSE DECISIONS

FIELD

Various embodiments relate to wireless communications, and more particularly, to methods and apparatus related to reuse of a wireless resource.

BACKGROUND

In a wireless communications systems there are typically a limited amount of designated air link resources which may be used by members of the system. It would be beneficial, for purposes of efficiency and/or throughput, if at least some of the designated air link resources could be used concurrently by two different connections, e.g., two different connections which would have low interference with respect to one another if they were both to use the same resource concurrently. In a wireless communications system lacking centralized control it may be problematic to determine whether a particular resource which is in use by a first connection may be reused by another connection. Before two different connections to the same resource, one would like to make sure that both connections would be expected to achieve an acceptable communication reception quality level.

Based on the above discussion there is a need for new methods and apparatus facilitating reuse of a wireless resource, particularly in a wireless communications system lacking centralized control.

SUMMARY

Methods and apparatus related to reuse of a wireless resource are described. Various methods and apparatus are well suited to wireless communications systems lacking centralized control, e.g., an ad hoc peer to peer wireless communications system.

In some embodiments, a first wireless device of a first connection generates and transmits one or more control signals to be used by wireless devices of a second connection to make a resource reuse decision. The first connection may be, and sometimes is, an existing active connection. The second connection may be, and sometimes is, a potential connection. However, the approach is not limited to first and second connections being existing and potential connections. For a control signal, the first wireless device sets a transmission power level of the control signal based upon a predetermined relationship to at least one other signal previously communicated on the first connection, e.g., a received peer discovery or a received paging signal. In some embodiments, the one or more control signals are single tone OFDM signals. A transmitted control signal from the first device, transmitted at power level in accordance with predetermined relationship, facilitates the estimation of one or more expected SINRs by one or more devices of the second connection.

An exemplary communications method implemented in a first node, in accordance with some embodiments, comprises: receiving a first signal from a second node; determining a first power level of the received first signal; and transmitting a second signal at a second power level which has a predetermined relationship to the determined first power level. In some embodiments, the predetermined relationship is that the second power level is inversely proportional to the determined first power level. An exemplary first node, in accordance with some embodiments, comprises: at least one processor configured to: receive a first signal from a second node; determine a first power level of the received first signal; and transmit a second signal at a second power level which has a predetermined relationship to the determined first power level. The exemplary first node further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
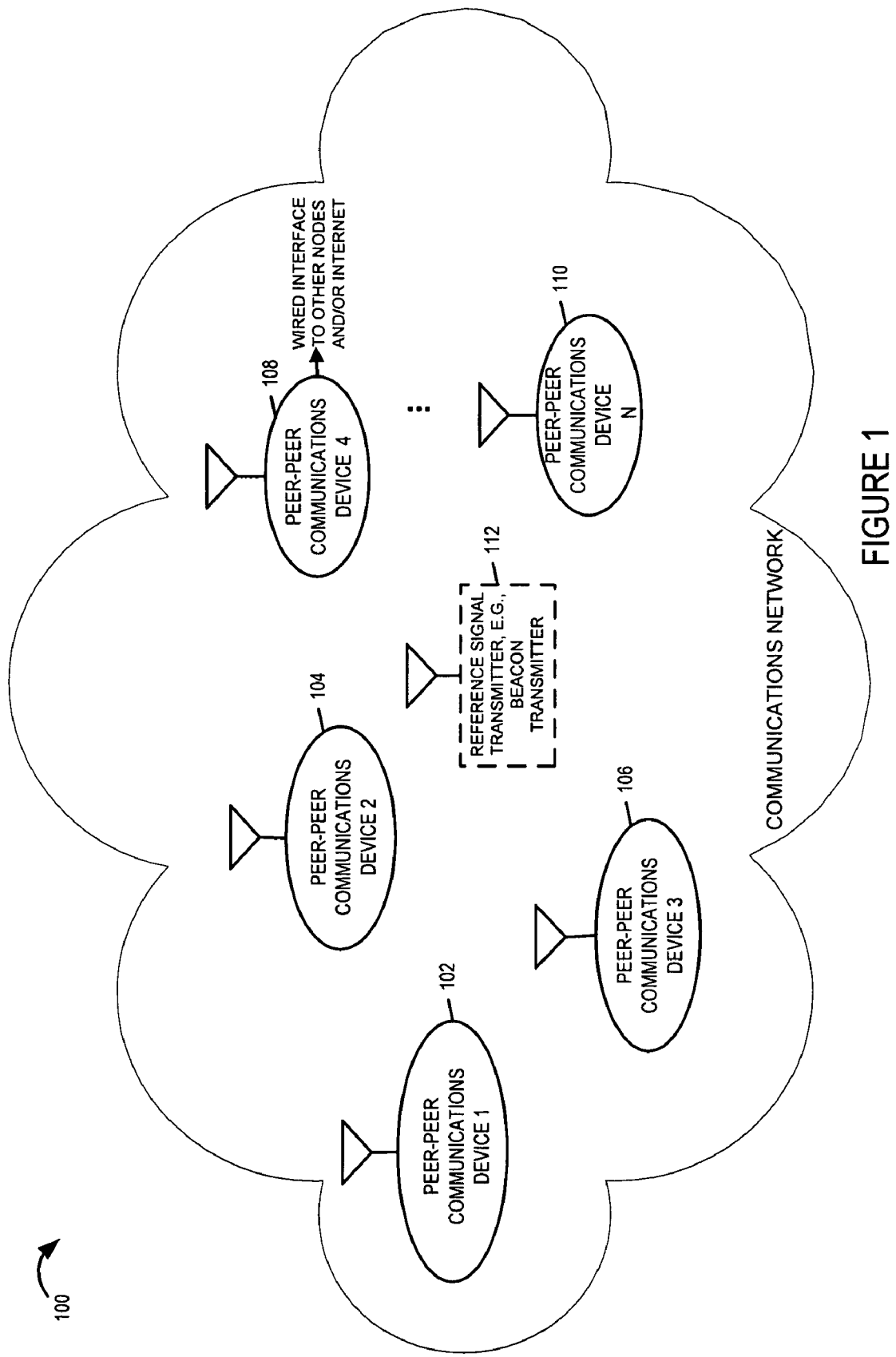
FIG. 1 is a drawing of an exemplary wireless communications system in accordance with an exemplary embodiment.

FIG. 1 is a drawing of an exemplary peer to peer communications network 100, e.g., an ad-hoc communications network, in accordance with an exemplary embodiment. The exemplary communications network 100 supports peer to peer signaling between communication devices, e.g., mobile and/or stationary wireless communications devices.

Exemplary peer to peer network 100 includes a plurality of wireless peer to peer communications devices (peer to peer communications device 1 102, peer to peer communications device 2 104, peer to peer communications device 3 106, peer to peer communications device 4 108, . . . , peer to peer communications device N 110) supporting peer to peer signaling. In some embodiments, the network 100 includes a reference signal transmitter 112, e.g., a beacon transmitter. The wireless devices (102, 104, 106, 108, . . . , 110) in the communications network 100 can establish connections with one another, e.g., peer to peer connections, and communicate with one another. In some embodiments, there is a recurring timing structure used in the network 100. In some such embodiments a reference signal, e.g., an OFDM beacon signal from reference signal transmitter 112, is used by a wireless device to synchronize with respect to the timing structure. Alternatively, a signal used to synchronize with the timing structure may be sourced from another device, e.g., a GPS transmitter, a base station or another peer to peer device.

Exemplary network 100 supports the spatial reuse of a wireless resource across different wireless links. In some embodiments, decisions regarding reuse of a wireless resource are performed in a decentralized manner. In various embodiments, a pair of devices of an existing connection associated with a resource, broadcast control signals having specific power relationships. The control signals are available to other connection devices, which may desire to reuse the same wireless resource, to receive and measure. The measurements are used to generate estimated SINRs upon which a resource reuse decision is based.

Figure 2:
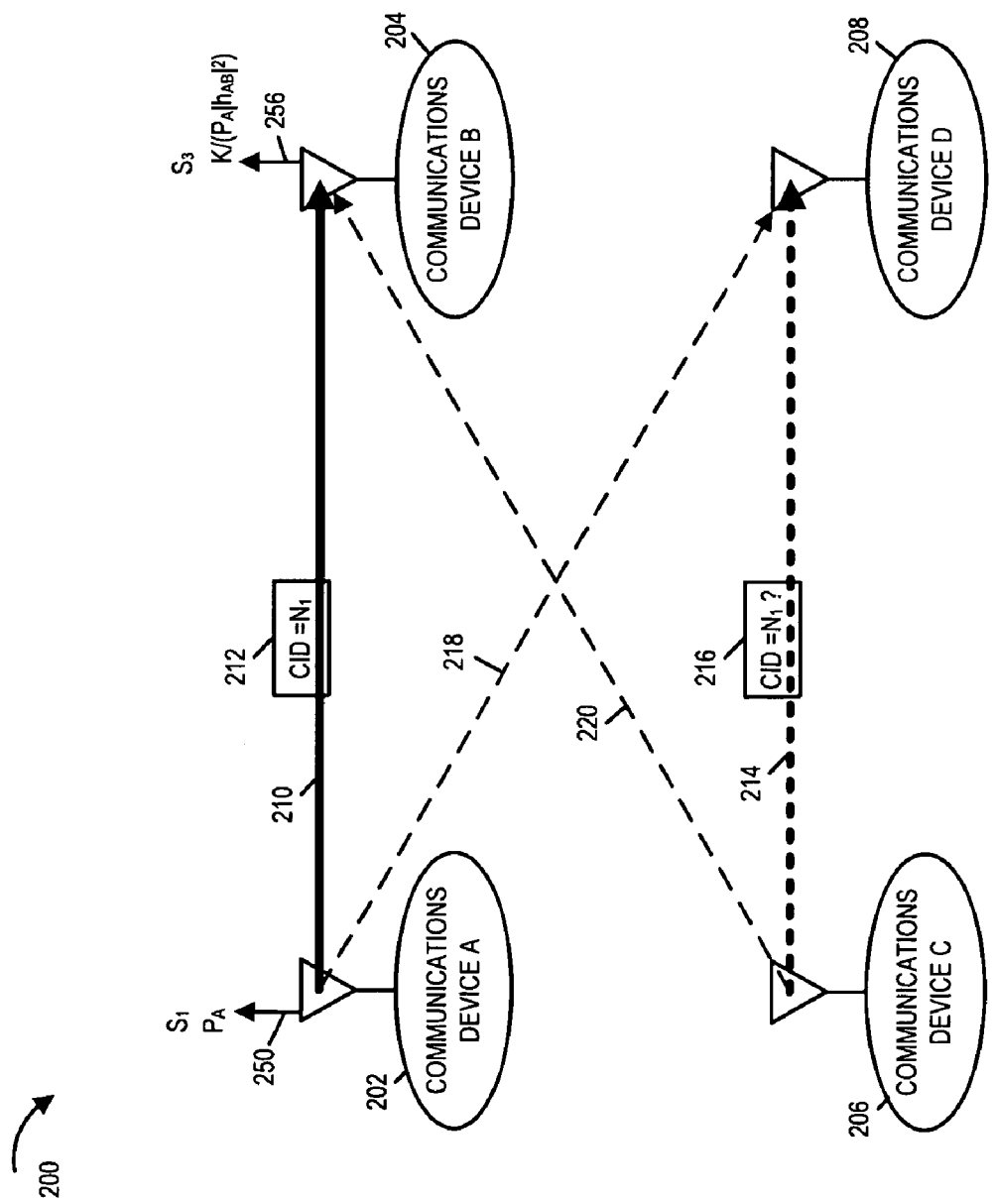
FIG. 2 is a drawing illustrating four exemplary wireless communications devices and is used to describe features of some embodiments.

FIG. 2 is a drawing 200 illustrating four exemplary wireless communications devices (communications device A 202, communications device B 204, communications device C 206, communications device D 208) and is used to describe features of some embodiments. In the example of FIG. 2, device A 202 and device B 204 have an existing connection, as indicated by solid line uni-direction arrow 210, corresponding to currently held connection identifier 212, which is CID=$N_1$, e.g., where $N_1$ is an integer value in the range 1 . . . 168. In the timing structure being utilized for the example, there is a set of air link resources associated with CID=$N_1$. Devices (202, 204, 206, 208) are part of a peer to peer communications system in which at least some resources may be, and sometimes are, used concurrently by multiple connections, e.g., depending upon interference conditions. For example, if the first device pair (device A 202, device B 204) is far away from second device pair (device C 206, device D 208), then the interference levels may be sufficiently low enough that concurrent transmissions may be allowed to occur on the same air link resource.

In this example, device C 206 and device D 208 would like to have a connection, as indicated by dotted line arrow 214, and would like to check if they can use the same connection identifier currently held by the device A 202/device B 204 connection, as indicated by block 216. In this example, we are concerned about one way communications from device A 202 to device B 204 and one way communications from device C 206 to device D 208. Therefore, we are concerned about potential interference 220 from a device C 206 transmission impacting device B's 204 ability to successfully recover a signal from device A 202. In such a scenario, we are also concerned about potential interference 218 from a device A 202 transmission impacting device D's 208 ability to successfully recover a signal from device C 206.

In accordance with one feature of some embodiments, communications devices of existing connections transmit signals available for use by potential connection wireless devices to estimate expected SINRs should both the current connection and the potential connection use the same air link resources concurrently. In this example, communications device A 202 transmits signal $S_1$ 250 at power level $P_A$. Communications device B 204 transmits signal $S_3$ 256 at power level $K/(P_A|h_{AB}|^2)$, where K is a known constant and $|h_{AB}|$ is the magnitude of the channel gain between communications device A 202 and communications device B 204. Device C 206 receives and measured signal $S_3$ 256, and estimates an expected SINR at communications device B 204 should concurrent resource usage occur. Device D 208 receives and measured signal $S_3$ 250, and estimates an expected SINR at communications device D 208 should concurrent resource usage occur. Based on the determined estimated SINRs, device C 206 and/or device D 208 make a decision as whether or not a connection 214 can be established using the same CID as connection 210, e.g., both existing and new connection use CID=$N_1$. In one embodiment, for the potential connection to be allowed to reuse the resource of interest, both SINRs should be equal to or greater than a threshold limit criteria, e.g., 20 dBs.

Figure 3:
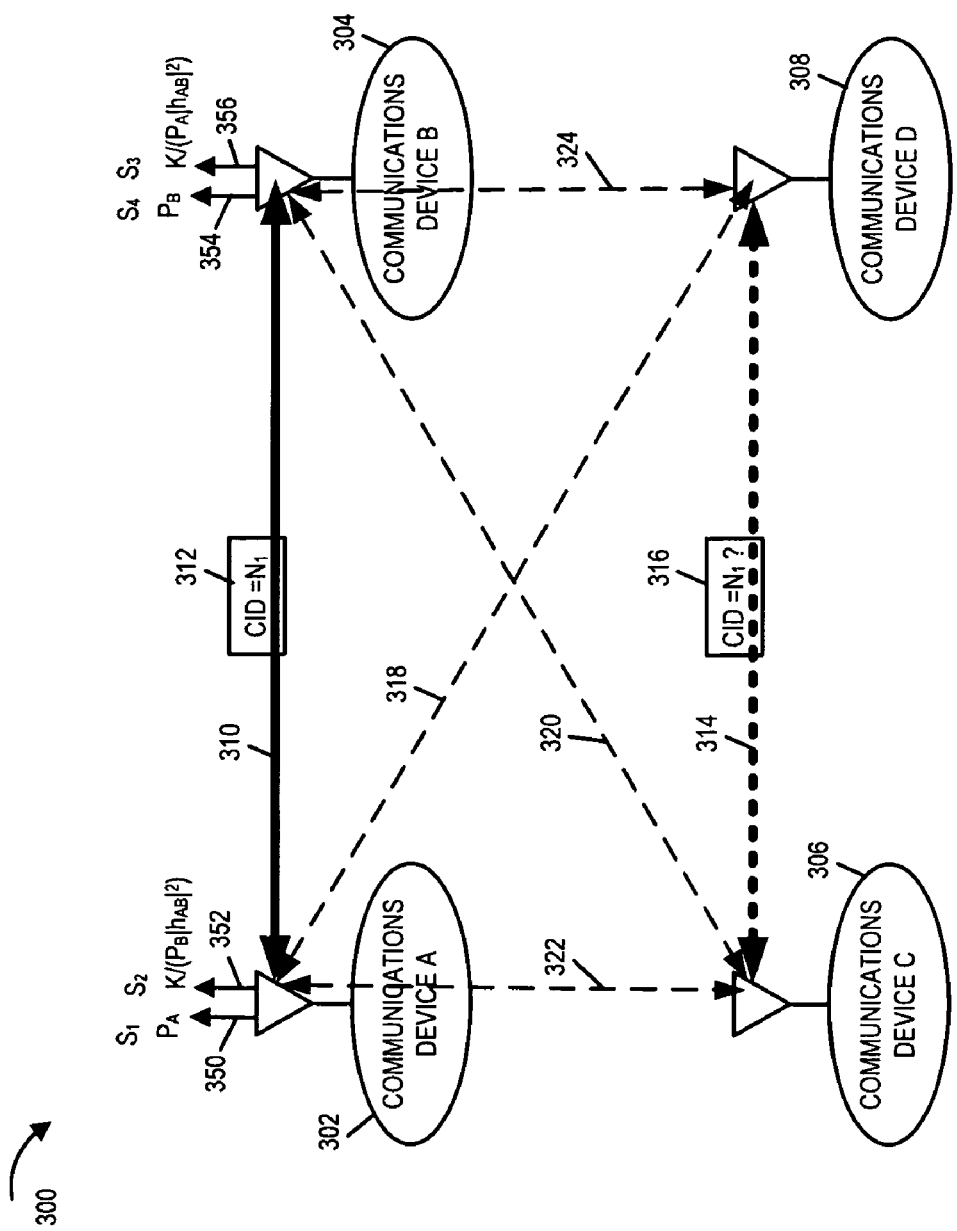
FIG. 3 is a drawing illustrating four exemplary wireless communications devices and is used to describe features of some embodiments.

FIG. 3 is a drawing 300 illustrating four exemplary wireless communications devices (communications device A 302, communications device B 304, communications device C 306, communications device D 308) and is used to describe features of some embodiments. In the example of FIG. 3, device A 302 and device B 304 have an existing connection, as indicated by solid line bi-directional arrow 310, corresponding to currently held connection identifier 312, which is CID=$N_1$, e.g., where $N_1$ is an integer value in the range 1 . . . 168. In the timing structure being utilized for the example, there is a set of air link resources associated with CID=$N_1$. Devices (302, 304, 306, 308) are part of a peer to peer communications system in which at least some resources may be, and sometimes are, used concurrently by multiple connections, e.g., depending upon interference conditions. For example, if the first device pair (device A 302, device B 304) is far away from second device pair (device C 306, device D 308), then the interference levels may be sufficiently low enough that concurrent transmissions may be allowed to occur on the same air link resource.

In this example, device C 306 and device D 308 would like to have a connection, as indicated by dotted line bi-directional arrow 314, and would like to check if they can use the same connection identifier currently held by the device A 302/device B 304 connection, as indicated by block 316. In this example, we are concerned about two way communications from device A 302 to device B 304 and two way communications from device C 306 to device D 308. Bi-directional arrow 318 indicates that signals from device A 302 may cause interference to device D 308 recovery of signals from device C 306, and that signals from device D 308 may cause interference to device A 302 recovery of signals from device B 304. Bi-directional arrow 320 indicates that signals from device B 304 may cause interference to device C 306 recovery of signals from device D 308, and that signals from device B 304 may cause interference to device C 306 recovery of signals from device D 308. Bi-directional arrow 322 indicates that signals from device A 302 may cause interference to device C 306 recovery of signals from device D 308, and that signals from device C 306 may cause interference to device A 302 recovery of signals from device B 304. Bi-directional arrow 324 indicates that signals from device B 304 may cause interference to device D 308 recovery of signals from device C 306, and that signals from device D 308 may cause interference to device B 304 recovery of signals from device A 302.

In accordance with one feature of some embodiments, communications devices of existing connections transmit signals available for use by potential connection wireless devices to estimate expected SINRs should both the current connection and the potential connection use the same air link resources concurrently. In this example, communications device A 302 transmits signal $S_1$ 350 at power level $P_A$ and signal $S_2$ 352 at power level $K/(P_B|h_{AB}|^2)$, where K is a known constant and $|h_{AB}|$ is the magnitude of the channel gain between device A 302 and device B 304. Communications device B 304 transmits signal $S_4$ 354 at power level $P_B$ and signal $S_3$ 356 at power level $K/(P_A|h_{AB}|^2)$.

Device C 306 receives and measures signals $S_1$ 350, $S_2$ 352, $S_4$ 354 and $S_3$ 356 and estimates four SINRs based on its measurements. Similarly, device D 308 receives and measures signals $S_1$ 350, $S_2$ 352, $S_4$ 354 and $S_3$ 356 and estimates four SINRs based on its measurements. Based on the determined estimated SINRs, device C 306 and/or device D 308 make a decision as whether or not a connection 314 can be established using the same CID as connection 310, e.g., both existing and new connection use CID=$N_1$. In one embodiment, for the potential connection to be allowed to reuse the resource of interest, each of the eight SINRs should be equal to or greater than a threshold limit criteria, e.g., 20 dBs.

Figure 4A:
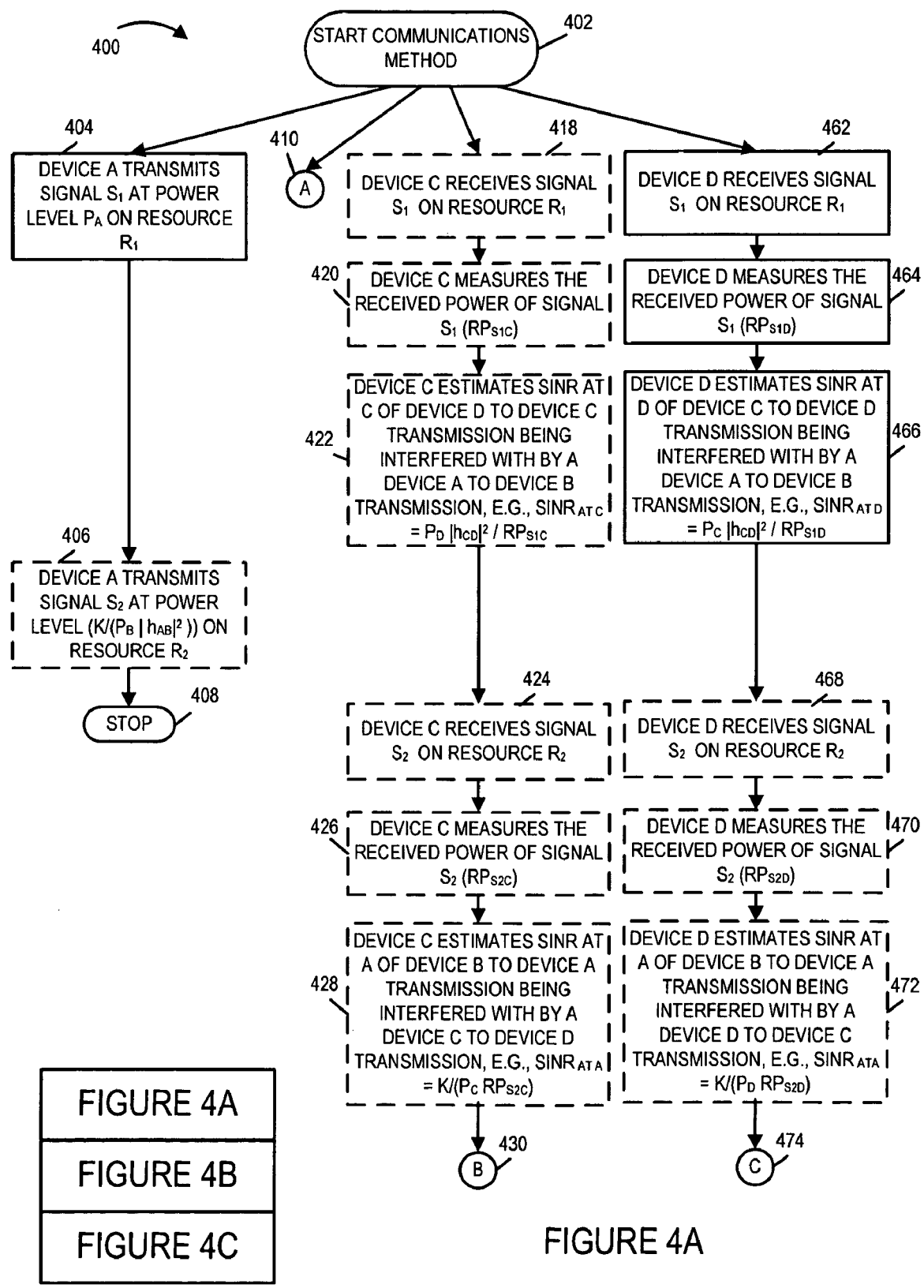
FIG. 4A is a first part of a three part flowchart of an exemplary communications method in accordance with an exemplary embodiment.
Figure 4B:
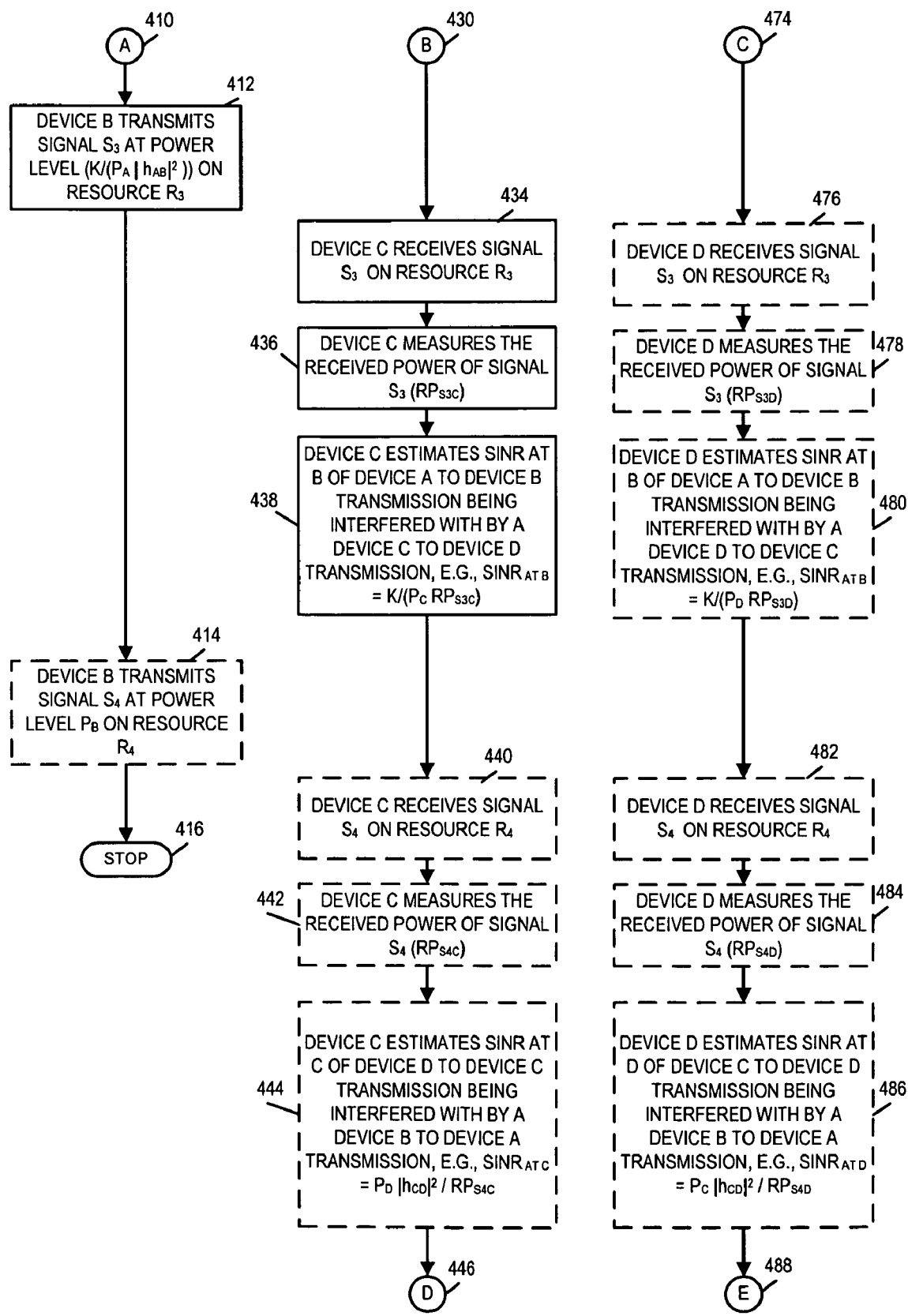
FIG. 4B is a second part of a three part flowchart of an exemplary communications method in accordance with an exemplary embodiment.
Figure 4C:
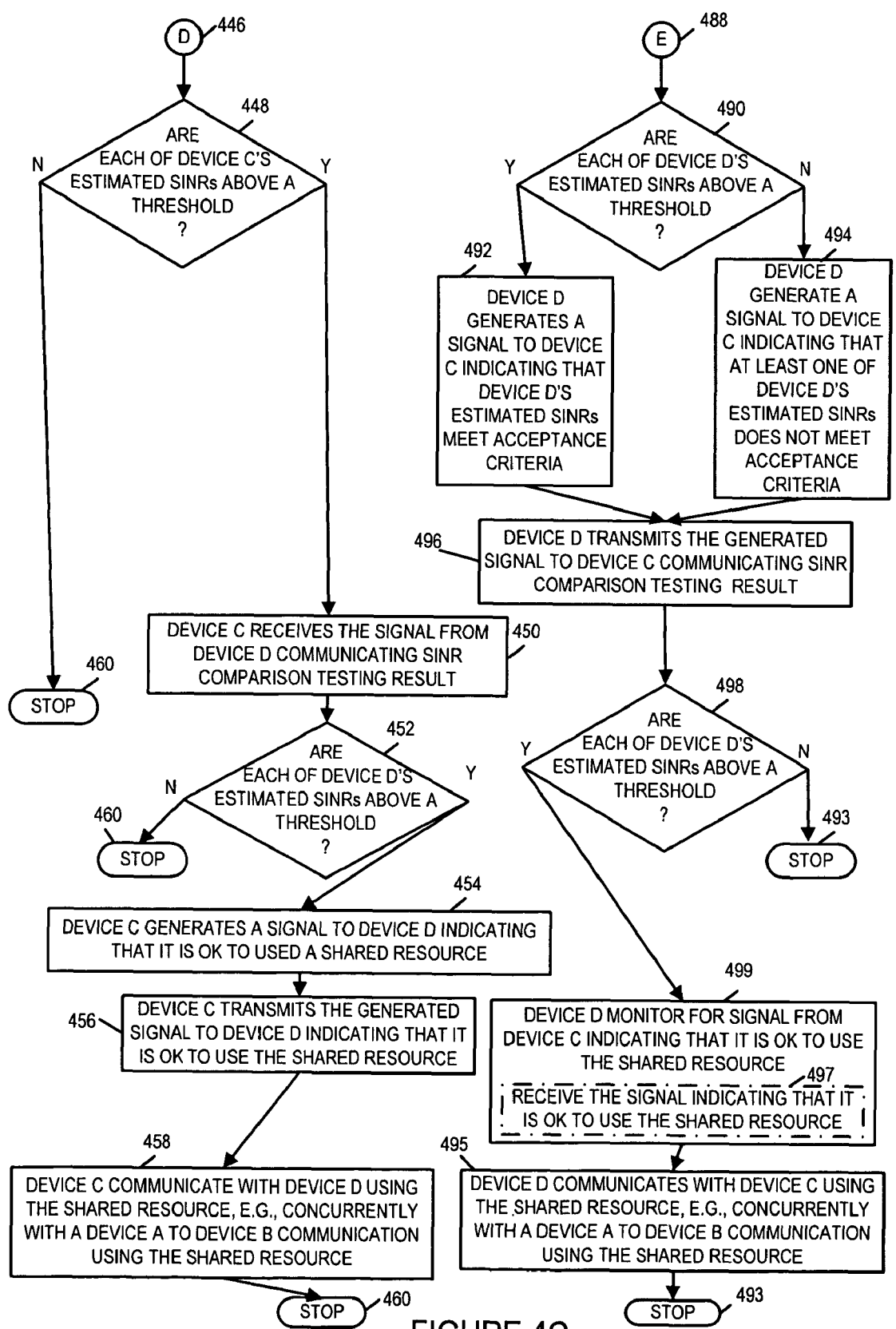
FIG. 4C is a third part of a three part flowchart of an exemplary communications method in accordance with an exemplary embodiment.

FIG. 4, comprising the combination of FIG. 4A, FIG. 4B, FIG. 4C and FIG. 4D, is a flowchart 400 of an exemplary communications method in accordance with an exemplary embodiment. Operation starts in step 402, where communications devices (device A, device B, device C, and device D) are powered on and initialized. Operation proceeds from step 402 to step 404 for device A; operation proceeds from step 402 via connecting device A 410 to step 412 for device B; operation proceeds from step 402 to step 418 for device C; and operation proceeds from step 402 to step 462 for device D.

Returning to step 404, in step 404 device A transmits signal $S_1$ at power level $P_A$ on resource $R_1$. Operation proceeds from step 404 to step 406. In step 406, device A transmits signal $S_2$ at power level $K/(P_B|h_{AB}|^2)$ on resource $R_2$. Operation proceeds from step 406 to stop step 408.

Returning to step 412, in step 412, device B transmits signal $S_3$ at power level $K/(P_A|h_{AB}|^2)$ on resource $R_3$. Operation proceeds from step 412 to step 414. In step 414 device B transmits signal $S_4$ at power level $P_B$ on resource $R_4$. Operation proceeds from step 414 to stop step 416.

Returning to step 418, in step 418 device C receives signal $S_1$ on resource $R_1$. Operation proceeds from step 418 to step 420. In step 420 device C measures the received power of signal $S_1$ obtaining $RP_{S1C}$. Then, in step 422 device C estimates an SINR at device C of a device D to device C transmission being interfered with by a device A to device B transmission, e.g., $SINR_{ATC}=P_D|h_{CD}|^2/RP_{S1C}$. Operation proceeds from step 422 to step 424.

In step 424, device C receives signal $S_2$ on resource $R_2$. Operation proceeds from step 424 to step 426. In step 426 device C measures the received power of signal $S_2$ obtaining $RP_{S2C}$. Then, in step 428 device C estimates an SINR at device A of a device B to device A transmission being interfered with by a device C to device D transmission, e.g., $SINR_{ATA}=K/(P_C RP_{S2C})$. Operation proceeds from step 428 via connecting node B 430 to step 434.

In step 434, device C receives signal $S_3$ on resource $R_3$. Operation proceeds from step 434 to step 436. In step 436 device C measures the received power of signal $S_3$ obtaining $RP_{S3C}$. Then, in step 438 device C estimates an SINR at device B of a device A to device B transmission being interfered with by a device C to device D transmission, e.g., $SINR_{ATB}=K/(P_C RP_{S3C})$. Operation proceeds from step 438 to step 440.

In step 440 device C receives signal $S_4$ on resource $R_4$. Operation proceeds from step 440 to step 442. In step 442 device C measures the received power of signal $S_4$ obtaining $RP_{S4C}$. Then, in step 444 device C estimates an SINR at device C of a device D to device C transmission being interfered with by a device B to device A transmission, e.g., $SINR_{ATC}=P_D|h_{CD}|2/RP_{S4C}$. Operation proceeds from step 444 via connecting node D 446 to step 448.

Returning to step 462, in step 462 device D receives signal $S_1$ on resource $R_1$. Operation proceeds from step 462 to step 464. In step 464 device D measures the received power of signal $S_1$ obtaining $RP_{S1D}$. Then, in step 466 device D estimates an SINR at device D of a device C to device D transmission being interfered with by a device A to device B transmission, e.g., $SINR_{ATD}=P_C|h_{CD}|2/RP_{S1D}$. Operation proceeds from step 466 to step 468.

In step 468, device D receives signal $S_2$ on resource $R_2$. Operation proceeds from step 468 to step 470. In step 470 device D measures the received power of signal $S_2$ obtaining $RP_{S2D}$. Then, in step 472 device D estimates an SINR at device A of a device B to device A transmission being interfered with by a device D to device C transmission, e.g., $SINR_{ATA}=K/(P_D RP_{S2D})$. Operation proceeds from step 472 via connecting node C 474 to step 476.

In step 476, device D receives signal $S_3$ on resource $R_3$. Operation proceeds from step 476 to step 478. In step 478 device D measures the received power of signal $S_3$ obtaining $RP_{S3D}$. Then, in step 480 device D estimates an SINR at device B of a device A to device B transmission being interfered with by a device D to device C transmission, e.g., $SINR_{ATB}=K/(P_D RP_{S3D})$. Operation proceeds from step 480 to step 482.

In step 482 device D receives signal $S_4$ on resource $R_4$. Operation proceeds from step 482 to step 484. In step 484 device D measures the received power of signal $S_4$ obtaining $RP_{S4D}$. Then, in step 486 device D estimates an SINR at device D of a device C to device D transmission being interfered with by a device B to device A transmission, e.g., $SINR_{ATD}=P_C|h_{CD}|2/RP_{S4D}$. Operation proceeds from step 486 via connecting node E 488 to step 490. In step 490, device D compares each of the device D estimated SINRs, e.g., results of steps 466, 472, 480 and 486, to a threshold. If each of the device D estimated SINRs is above the threshold then operation proceeds from step 490 to step 492; otherwise, operation proceeds from step 490 to step 494.

In step 492 device D generates a signal to device C indicating that device D's estimated SINRs meet the acceptance criteria. In step 494 device D generates a signal to device C indicating that at least one of device D's estimated SINRs does not meet the acceptance criteria. Operation proceeds from step 492 or step 494 to step 496, in which device D transmits the generated signal of step 492 or step 494 to device C communicating the SINR comparison testing result. Operation proceeds from step 496 to step 498.

Returning to step 448, in step 448 device C compares each of the device C estimated SINRs, e.g., results of steps 422, 428, 438 and 444, to a threshold. If each of the device C estimated SINRs is above the threshold then operation proceeds from step 448 to step 450; otherwise, operation proceeds from step 448 to stop step 460.

Returning to step 450, in step 450 device C receives a signal from device D communicating the SINR comparison testing result, e.g., the signal communicated in step 496. Operation proceeds from step 450 to step 452. In step 452 device C checks if the received signal of step 450 indicates that each of device D's estimated SINRs are above the test threshold. If each of device D's estimated SINRs are not above the test threshold, then operation proceeds from step 452 to stop step 460; otherwise, operation proceeds from step 452 to step 454.

In step 454 device C generates a signal to device D indicating that it is ok to use the shared resource. Then, in step 456 device C transmits the generated signal to device D indicating that it is ok to use the shared resource. Operation proceeds from step 456 to step 458.

Returning to step 498, in step 498 device D is controlled to proceed from step 498 to step 499 if each of device D's estimates SINRs are above the test threshold. However, if at least one of device D's estimated SINRs is not above its test threshold, then device D is controlled to proceed from step 498 to stop step 493.

Returning to step 499, in step 499 device D monitors for a signal from device C indicating that it is ok to use the shared resource. Step 449 may, and sometimes does, include sub-step 497 in which device D receives the signal indicating that it is ok to use the shared resource. Operation proceeds from sub-step 497 to step 495 in which device D communicates with device C using the shared resource. Operation proceeds from step 495 to stop step 493.

Returning to step 458, in step 458 device C communicates with device D using the shared resource. Step 458 may be performed by device C while device D is performing step 495. For example, device C may be transmitting to device D and device D may be receiving the transmission. A communication between device A and device B may be, and sometimes is, occurring concurrently to the communications of steps 458/495 using the shared resource. Operation proceeds from step 458 to stop step 460.

FIG. 4 has been described above for an embodiment where each of the illustrated steps of FIG. 4 implemented, e.g., an embodiment where resource re-usage is being considered for potential bi-directional communications such as in FIG. 3. However, in some embodiments, such as in FIG. 2, resource re-usage is considered for uni-directional links, and in one such embodiment, steps 406, 414 418, 420, 422, 424, 426, 428, 440, 442, 444, 466, 468, 470, 472, 476, 478, 480, 482, 484, 486, and 497, which are indicated by dotted boxes, may be omitted and bypassed.

Figure 5A:
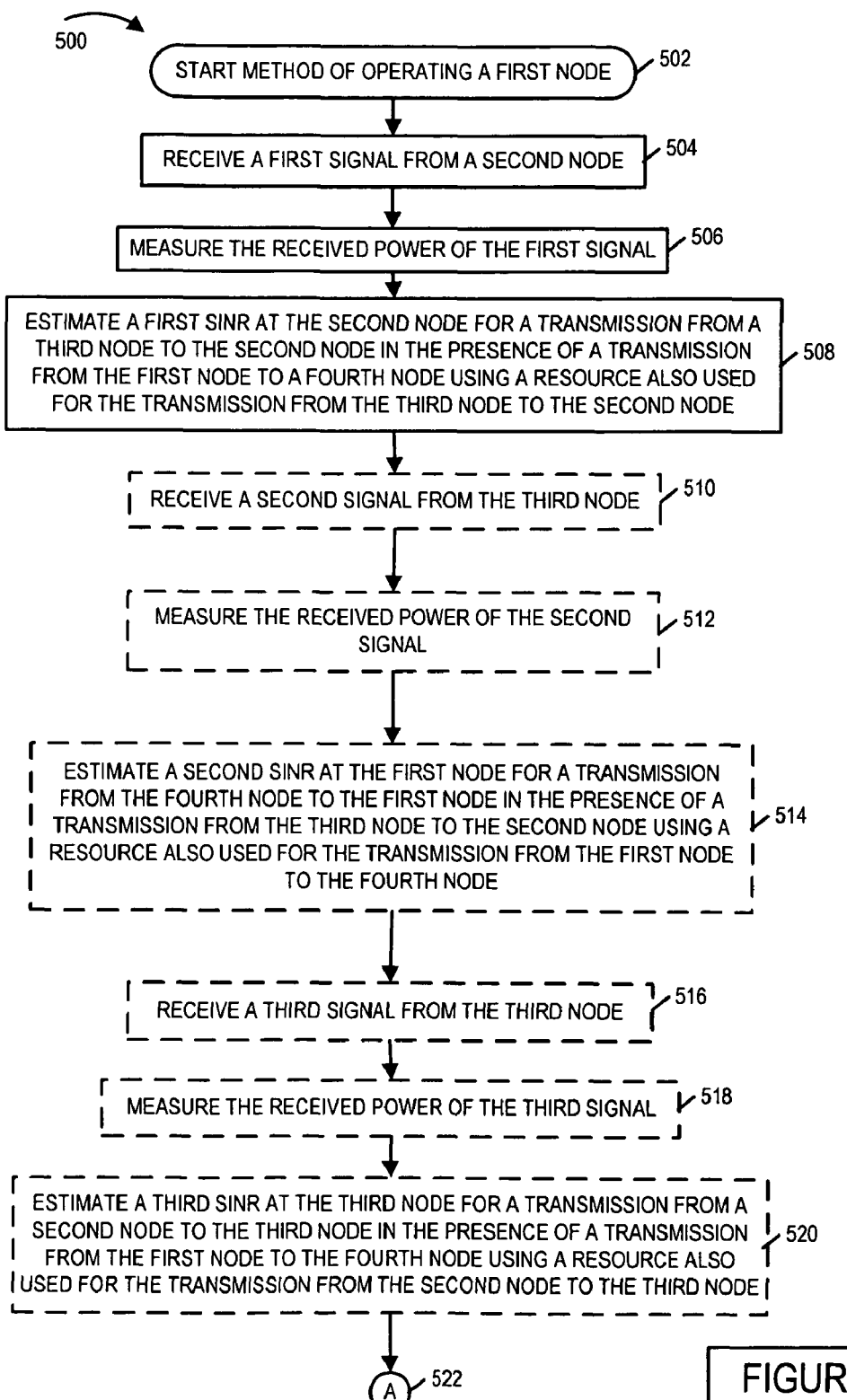
FIG. 5A is a first part of two part flowchart of an exemplary method of operating a communications device in accordance with an exemplary embodiment.
Figure 5B:
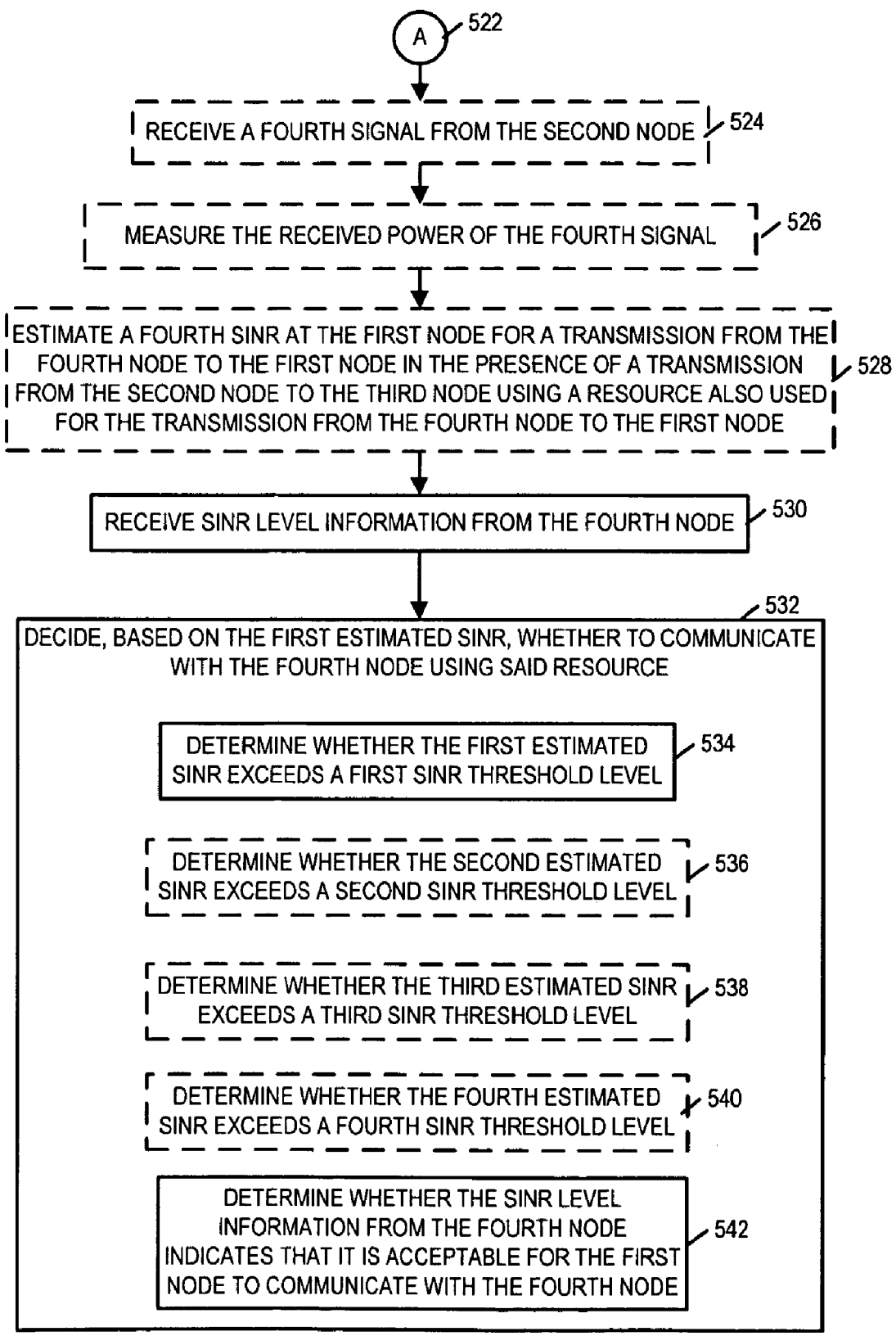
FIG. 5B is a second part of a two part flowchart of an exemplary method of operating a communications device in accordance with an exemplary embodiment.

FIG. 5, comprising the combination of FIG. 5A and FIG. 5B, is a flowchart 500 of an exemplary method of operating a first node in accordance with an exemplary embodiment. The exemplary first node is, e.g., exemplary communications device C 206 of FIG. 2 or exemplary communications device C 306 of FIG. 3. In one embodiment where the exemplary first node is device C 206 of FIG. 2, steps 510, 512, 514, 516, 518, 520, 524, 526 and 528 are omitted and bypassed. In one embodiment where the exemplary first node is device C 306 of FIG. 3, steps 510, 512, 514, 516, 518, 520, 524, 526 and 528 are included in the method. The exemplary first node may be one of the peer to peer communications devices of network 100 of FIG. 1. Operation starts in step 502, where the first node is powered on and initialized. Operation proceeds from start step 502 to step 504.

In step 504 the first node receives a first signal from a second node, e.g., signal $S_3$ 256 from device B 204 or signal $S_3$ 356 from device B 304. In some embodiments, the first signal is a signal which was transmitted by the second node at a power level inversely proportional to a power level of signal received from a third node, e.g., node A 202 or node A 302. Operation proceeds from step 504 to step 506. In step 506 the first node measures the received power of the first signal, e.g. obtaining $RP_{S3C}$. Then in step 508 the first node estimates a first SINR at the second node for a transmission from a third node to the second node in the presence of a transmission from the first node to a fourth node, e.g., node D 208 or node D 308, using a resource also used for the transmission from the third node to the second node. The first estimated SINR is, e.g., $SINR_{ATB}=K/(P_C RP_{S3C})$. Operation proceeds from step 508 to step 510.

In step 510, the first node receives a second signal from the third node, e.g. signal $S_1$ 350 from device A 302. Operation proceeds from step 510 to step 512. In step 512 the first node measures the received power of the second signal, e.g., obtaining $RP_{S1C}$. Then in step 514, the first node estimates a second SINR at the first node for a transmission from the fourth node to the first node in the presence of a transmission from the third node to the second node using a resource also used for the transmission from the first node to the fourth node. The second estimated SINR is, e.g., $SINR_{ATC}=P_D|h_{CD}|^2/RP_{S1C}$. Operation proceeds from step 514 to step 516.

In step 516 the first node receives a third signal from the third node, e.g., signal $S_2$ 352 from device A 302. Operation proceeds from step 516 to step 518. In step 518 the first node measures the received power of the third signal, e.g., obtaining $RP_{S2C}$. Then, in step 520 the first node estimates a third SINR at the third node for a transmission from the second node to the third node in the presence of a transmission from the first node to the fourth node using a resource also used for the transmission from the second node to the third node. The third estimated SINR is, e.g., $SINR_{ATA}=K/(P_C RP_{S2C})$. Operation proceeds from step 520 via connecting node A 522 to step 524.

In step 524 the first node receives a fourth signal from the second node, e.g., signal $S_4$ 354 from device B 304. Operation proceeds from step 524 to step 526. In step 526 the first node measures the received power of the fourth signal, e.g., obtaining $RP_{S4C}$. Then, in step 528 the first node estimates a fourth SINR at the first node for a transmission from the fourth node to the first node in the presence of a transmission from the second node to the third node using a resource also used for the transmission from the fourth node to the first node. The fourth estimated SINR is, e.g., $SINR_{ATC}=P_D|h_{CD}|^2/RP_{S4C}$. Operation proceeds from step 528 to step 530.

In step 530 the first node receives SINR level information from the fourth node. The received SINR level information includes, e.g., an SINR level and/or an indicator that an SINR determined by the fourth node exceeded a threshold level. In some embodiments, the received SINR level information is an indication as to whether or not each member of set of estimated SINRs calculated at the fourth node is above a threshold limit. For an embodiment, where one-way direction concurrent communication links are being considered using the same air link resource as in FIG. 2, the set is, e.g., a set of one SINR measurement. For an embodiment, where two way direction communications links are being considered using the same air link resource as in FIG. 3, the set is, e.g., a set of four SINRs. In some embodiments, the received SINR level information is a set of estimated SINRs calculated by the fourth node. In some embodiments, the received SINR level information is a connection identifier candidate list that may indicate exceeding SINR thresholds corresponding to CIDs on the candidate list. Operation proceeds from step 530 to step 532.

In step 532 the first node decides, based on the first estimated SINR, whether to communicate with the fourth node using said resource. Step 532 includes sub-steps 534 and 542. In some embodiments, step 532 also includes sub-steps 536, 538 and 540.

In sub-step 534, the first node determines whether the first estimated SINR exceeds a first SINR threshold level. In sub-step 536, the first node determines whether the second estimated SINR exceeds a second SINR threshold level. In some embodiments, deciding whether or not to communicate with the fourth node is also based on the second estimated SINR. In sub-step 538, the first node determines whether the third estimated SINR exceeds a third SINR threshold level. In sub-step 540, the first node determines whether the fourth estimated SINR exceeds a fourth SINR threshold level. In some embodiments, deciding whether to communicate with the fourth node using said resource is also based on each of the estimated third and fourth SINRs. In some embodiments, the first, second, third and fourth estimated SINR levels are the same value.

In sub-step 542 the first node determines whether the SINR level information from the fourth node indicates that it is acceptable for the first node to communicate with the fourth node. In some embodiments the determination of step 542 includes recovering a pass/fail indicator from the received SINR level information of step 530. In some other embodiments, the determination of step 542 includes comparing a set of received SINRs communicated in SINR level information received in step 530 to SINR threshold level criteria. In various embodiments, deciding whether or not to communicate with the fourth node is also based on the received SINR level information of step 530.

In some embodiments, deciding whether to communicate with the fourth node using said resource includes deciding to communicate when said first estimated SINR exceeds a first threshold level and said received SINR level information indicates a SINR over a second threshold or that the fourth node has determined that an SINR determined at the fourth node exceeds a second threshold. In some embodiments, the second threshold is the same first threshold used by the first node.

In some but not all embodiments, the same SINR threshold is used throughout the system for resource reuse decisions. In other embodiments, different SINR thresholds, used for resource reuse decisions, are associated with different nodes. In some embodiments, different SINR thresholds, used for resource reuse decisions, are associated with different connections. In some embodiments, a device uses different SINR thresholds for resource reuse decisions corresponding to different devices and/or connections.

Figure 6:
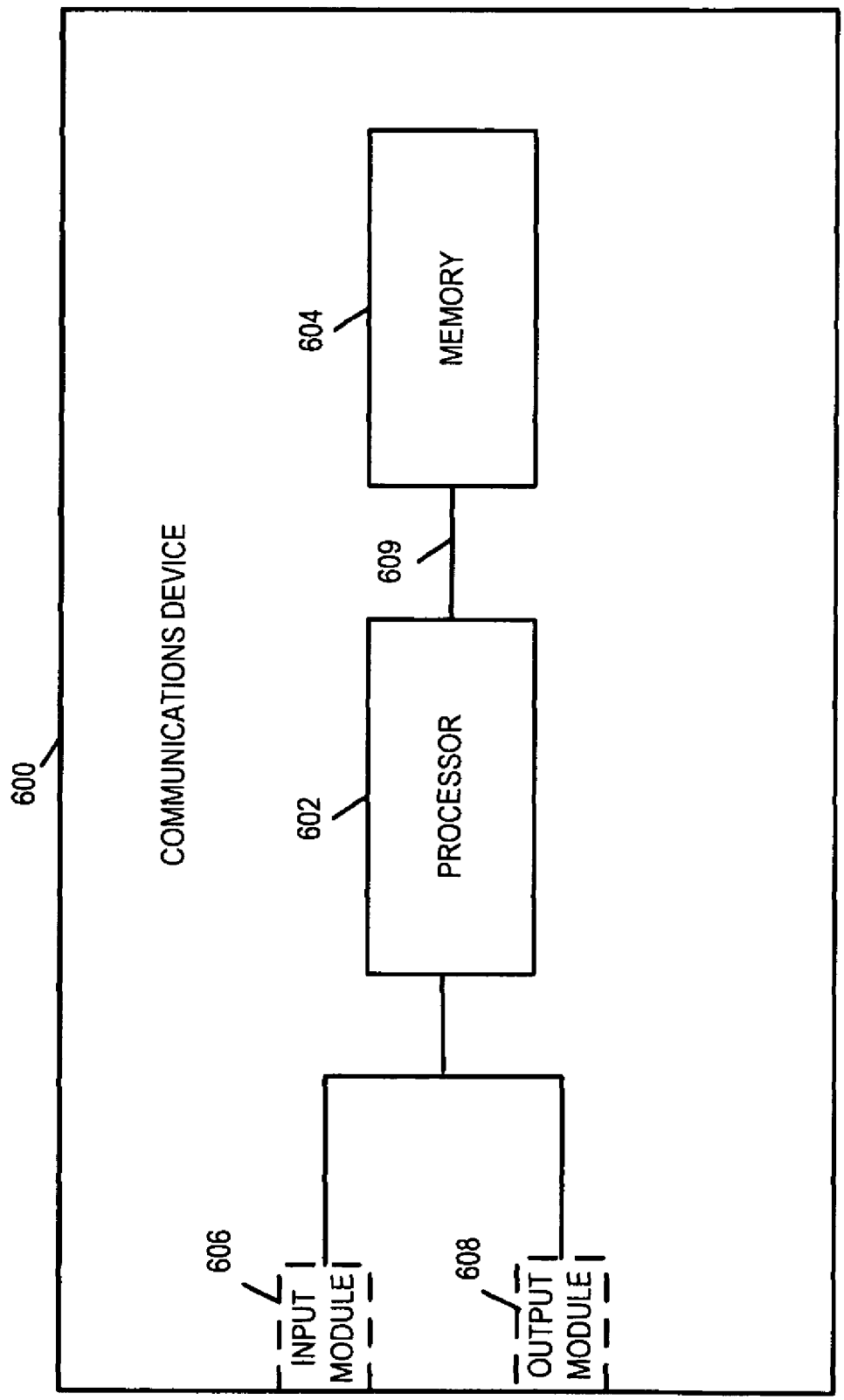
FIG. 6 is a drawing of an exemplary communications device in accordance with an exemplary embodiment.

FIG. 6 is a drawing of an exemplary communications device 600 in accordance with an exemplary embodiment. Exemplary communications device 600 is, e.g., communications device C 206 of FIG. 2 or communications device C 306 of FIG. 3. Exemplary communications device 600 may be one of the exemplary peer to peer communications devices of network 100 of FIG. 1. Exemplary communications device 600 implements a method in accordance with flowchart 500 of FIG. 5.

Communications device 600 includes a processor 602 and memory 604 coupled together via a bus 609 over which the various elements (602, 604) may interchange data and information. Communications device 600 further includes an input module 606 and an output module 608 which may be coupled to processor 602 as shown. However, in some embodiments, the input module 606 and output module 608 are located internal to the processor 602. Input module 606 can receive input signals. Input module 606 can, and in some embodiments does, include a wireless receiver and/or a wired or optical input interface for receiving input. Output module 608 may include, and in some embodiments does include, a wireless transmitter and/or a wired or optical output interface for transmitting output.

Processor 602 is configured to receive a first signal from a second node; measure the received power of the first signal; estimate a first SINR at the second node for a transmission from a third node to the second node in the presence of a transmission from the first node to a fourth node using a resource also used for the transmission from the third node to the second node; and decide based on the first estimated SINR whether to communicate with the fourth node using said resource. In some embodiments, said first signal is a signal which was transmitted by the second node at a power level inversely proportional to a power level of a signal received from the third node. In some embodiments, processor 602 is configured to determine if the estimated SINR exceeds a first SINR threshold level as part of being configured to decide based on the estimated SINR.

In some embodiments, processor 602 is further configured to: receive SINR level information from the fourth node; and being configured to decide whether to communicate with the fourth node includes being configured to base the decision on the received SINR level information.

In various embodiments, being configured to decide based on the estimated SINR whether to communicate includes being configured to decide to communicate when said estimated SINR exceeds a first threshold level and said received SINR level information indicates a SINR over a second threshold or that the fourth node has determined that an SINR determined at the fourth node exceeds a second threshold Tin some embodiments, the second threshold may be the same as the first threshold used by the first node.

In some embodiments, processor 602 is configured to: receive a second signal from a third node; measure the received power of the second signal; estimate a second SINR at the first node for a transmission from the fourth node to the first node in the presence of a transmission from the third node to a second node using a resource also used for the transmission from the first node to the fourth node; and being configured to decide whether to communicate with the fourth node using said resource also includes being configured to decide based on the second estimated SINR.

Processor 602, in some embodiments, is configured to: receive a third signal from the third node; measure the received power of the third signal; and estimate a third SINR at the third node for a transmission from a second node to the third node in the presence of a transmission from first node to a fourth node using a resource also used for the transmission from the second node to the third node. In some such embodiments, processor 602 is further configured to: receive a fourth signal from a second node; measure the received power of the fourth signal; and estimate a fourth SINR at the first node for a transmission from a fourth node to the first node in the presence of a transmission from second node to a third node using a resource also used for the transmission from the fourth node to the first node. In various embodiments, being configured to decide whether to communicate with the fourth node using said resource includes being configured to base the decision on each of the estimated third and fourth SINRs.

Figure 7:
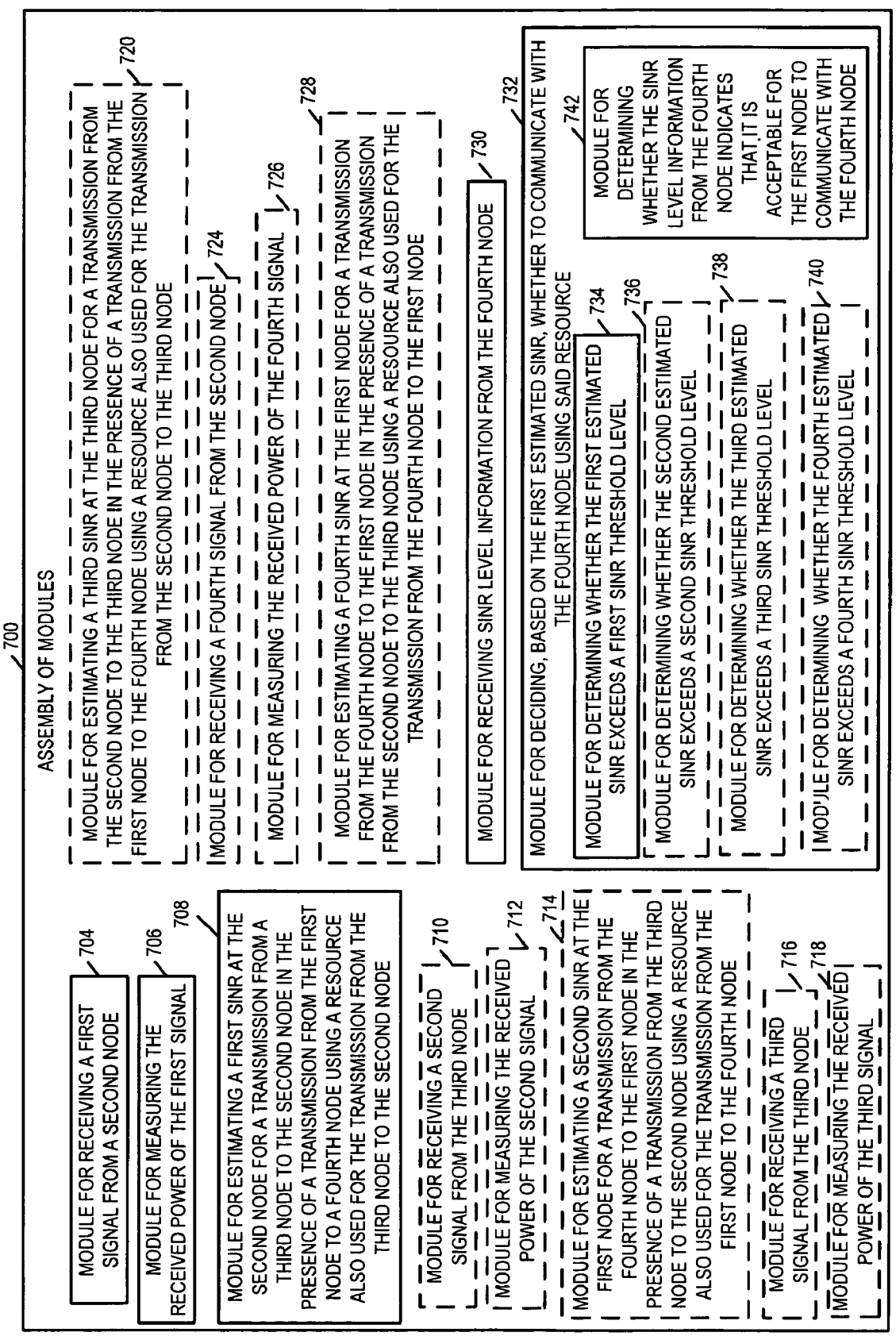
FIG. 7 is an assembly of modules which can, and in some embodiments are, used in the communications device illustrated in FIG. 6.

FIG. 7 is an assembly of modules 700 which can, and in some embodiments are, used in the communications device 600 illustrated in FIG. 6. The modules in the assembly 700 can be implemented in hardware within the processor 602 of FIG. 6, e.g., as individual circuits. Alternatively, the modules may be implemented in software and stored in the memory 604 of the communications device 600 shown in FIG. 6. While shown in the FIG. 6 embodiment as a single processor, e.g., computer, it should be appreciated that the processor 602 may be implemented as one or more processors, e.g., computers. When implemented in software the modules include code, which when executed by the processor, configure the processor, e.g., computer, 602 to implement the function corresponding to the module. In embodiments where the assembly of modules 700 is stored in the memory 604, the memory 604 is a computer program product comprising a computer readable medium comprising code, e.g., individual code for each module, for causing at least one computer, e.g., processor 602, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 7 control and/or configure the communications device 600 or elements therein such as the processor 602, to perform the functions of the corresponding steps illustrated in the method flowchart 500 of FIG. 5.

As illustrated in FIG. 7, the assembly of modules 700 includes: a module 704 for receiving a first signal from a second node, a module 706 for measuring the received power of the first signal, a module 708 for estimating a first SINR at the second node for a transmission from a third node to the second node in the presence of a transmission from the first node to a fourth node using a resource also used for transmission from the third node to the second node, a module 730 for receiving SINR level information from the fourth node, and a module 732 for deciding, based on the first estimated SINR, whether to communicate with the fourth node using said resource.

In some embodiments, assembly of modules 700 includes one or more of: a module 710 for receiving a second signal from the third node, a module 712 for measuring the received power of the second signal, a module 714 for estimating a second SINR at the first node for a transmission from the fourth node to the first node in the presence of a transmission from the third node to the second node using a resource also used for the transmission from the first node to the fourth node, a module 716 for receiving a third signal from the third node, a module 718 for measuring the received power of the third signal, a module 720 for estimating a third SINR at the third node for a transmission from the second node to the third node in the presence of a transmission from the first node to the fourth node using a resources also used for the transmission from the second node to the third node, a module 724 for receiving a fourth signal from the second node, a module 726 for measuring the received power of the fourth signal, and a module 728 for estimating a fourth SINR at the first node for a transmission from the fourth node to the first node in the presence of a transmission from the second node to the third node using a resource also used for the transmission from the fourth node to the first node.

Module 732 includes a module 734 for determining whether the first estimated SINR exceeds a first SINR threshold level and a module 742 for determining whether the SINR information from the fourth node indicates that it is acceptable for the first node to communicate with the fourth node. In some embodiments module 732 further includes one or more of: a module 736 for determining whether the second estimated SINR exceeds a second SINR threshold level, a module 738 for determining whether the third estimated SINR exceeds a third SINR threshold level and a module 740 for determining whether the fourth estimated SINR exceeds a fourth SINR threshold level.

In some embodiments, the first signal is a signal which was transmitted by the second node at a power level inversely proportional to a power level of a signal received from the third node. In various embodiments, the module 732 for deciding, based on the first estimated SINR, whether to communicate with the fourth node using said resource decides to communicate when said first estimated SINR exceeds a first threshold level and said received SINR level information indicates a SINR over a second threshold or that the fourth node has determined that an SINR determined at the fourth node exceeds a second threshold level. In some embodiments, the second threshold level is the same as the first threshold level used by the first node.

The module 732 for deciding whether to communicate with the fourth node using said resource, in some embodiments, also bases its decision on the second estimated SINR. The module 732 for deciding whether to communicate with the fourth node using said resource, in some embodiments, bases its decision on each of the estimated third and fourth SINRs.

Figure 8A:
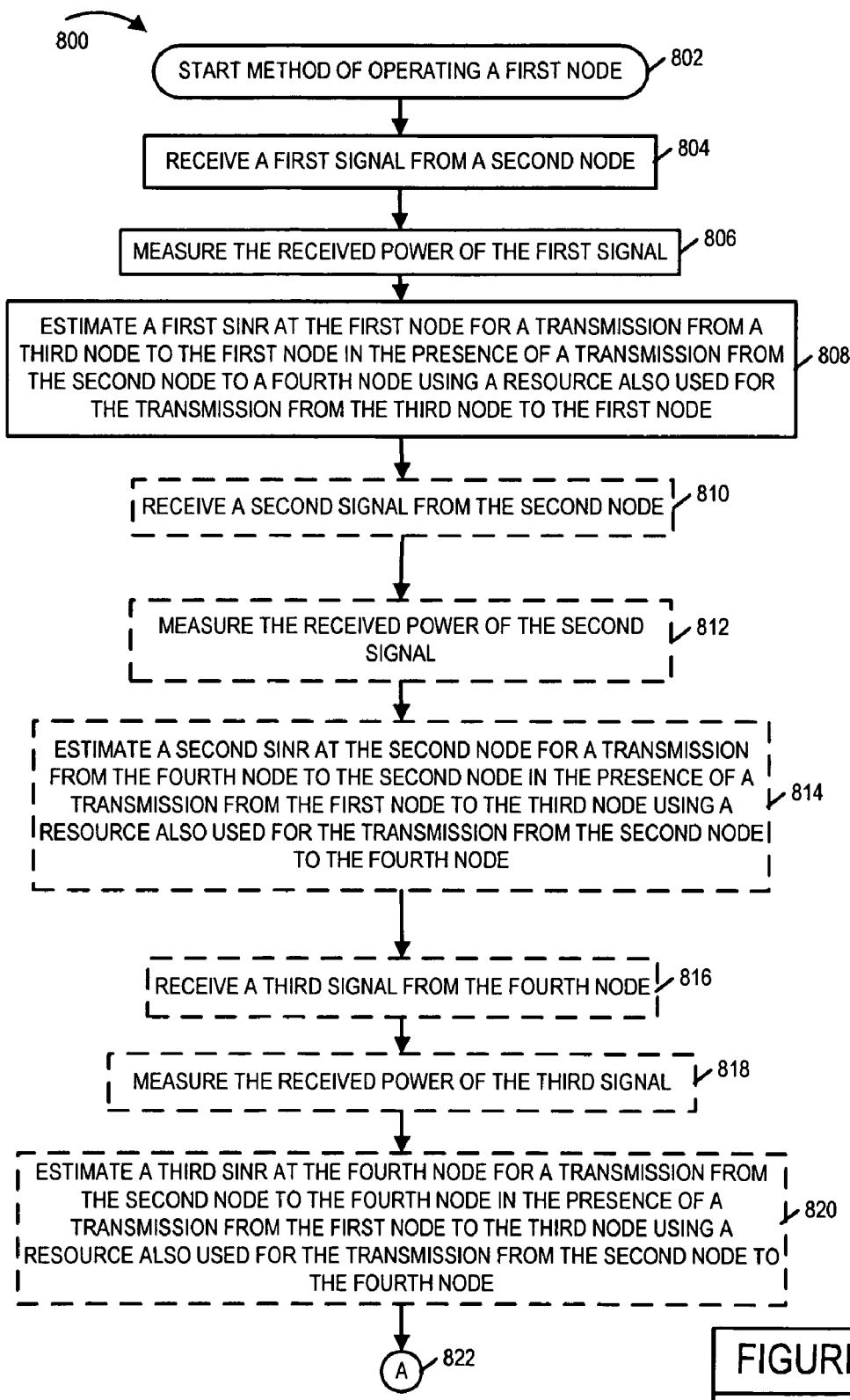
FIG. 8A is a first part of a flowchart of another exemplary method of operating a communications device in accordance with an exemplary embodiment.
Figure 8B:
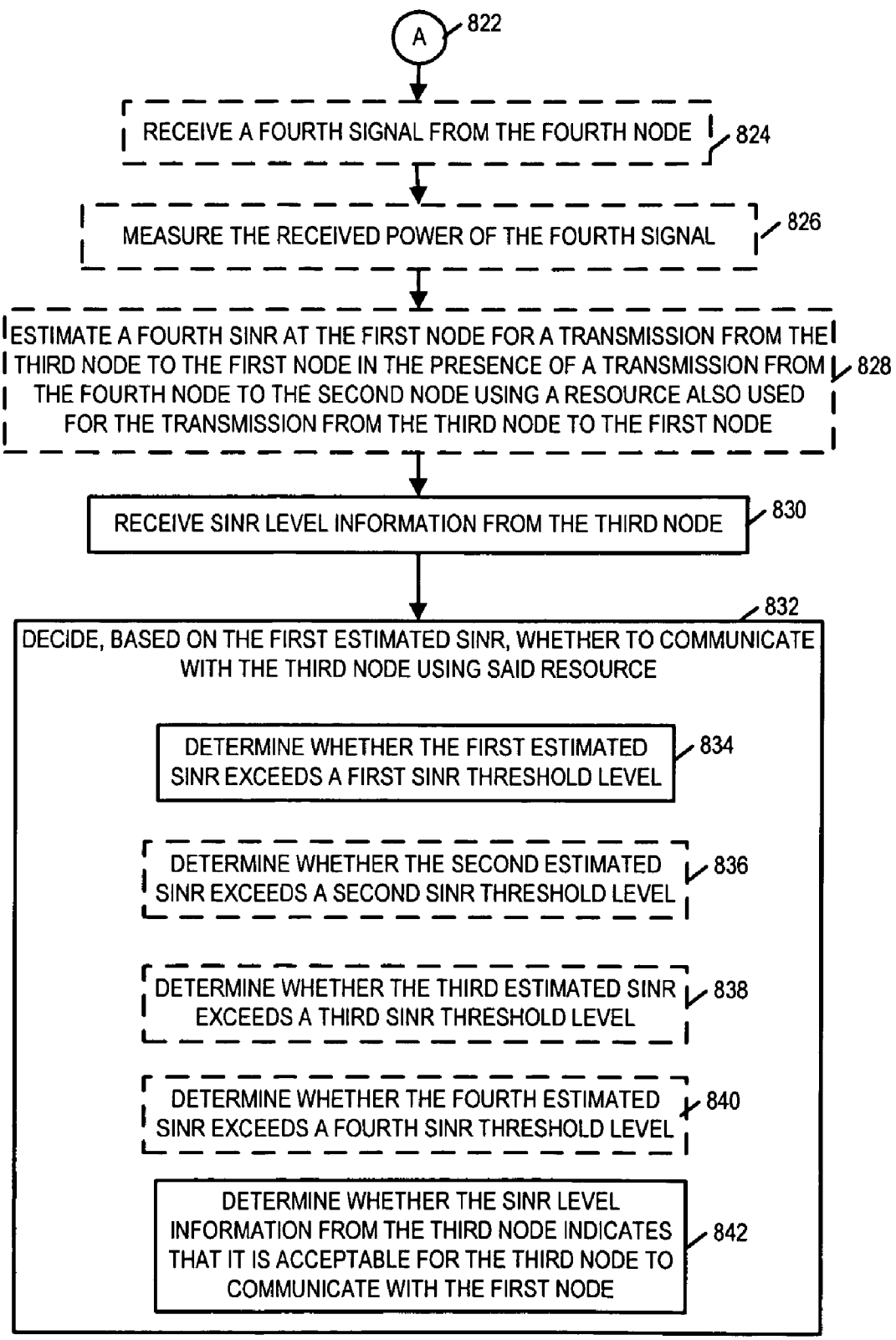
FIG. 8B is a second part of the flowchart of said another exemplary method of operating a communications device in accordance with an exemplary embodiment.

FIG. 8, comprising the combination of FIG. 8A and FIG. 8B, is a flowchart 800 of an exemplary method of operating a first node in accordance with an exemplary embodiment. The exemplary first node is, e.g., communications device D 208 of FIG. 2 or communications device D 308 of FIG. 3. In one embodiment where the exemplary first node is device D 208 of FIG. 2, steps 810, 812, 814, 816, 818, 820, 824, 826 and 828 are omitted and bypassed. In one embodiment where the exemplary first node is device D 308 of FIG. 3, steps 810, 812, 814, 816, 818, 820, 824, 826 and 828 are included in the method. The first node may be one of the exemplary peer to peer communications devices of network 100 of FIG. 1. Operation starts in step 802 where the first node is powered on and initialized and proceeds to step 804. In step 804 the first node receives a first signal from a second node, e.g., signal $S_1$ 250 from device A 202 or signal $S_1$ 350 from device A 302. In some embodiments, the first signal is a signal which was transmitted by the second node at a predetermined power level, e.g., $P_A$. Operation proceeds from step 804 to step 806. In step 806 the first node measures the received power of the first signal, e.g., obtaining $RP_{S1D}$. Then in step 808 the first node estimates a first SINR at the first node for a transmission from the third node to the first node in the presence of a transmission from the second node to a fourth node using a resource also used for the transmission from the third node to the first node. The third node is, e.g., device C 206 of FIG. 2 or device C 306 of FIG. 3. The fourth node is, e.g., device B 204 of FIG. 2 or device B 304 of FIG. 3. The first estimated SINR is, e.g., $SINR_{ATD} = P_C|h_{CD}|^2/RP_{S1D}$. Operation proceeds from step 808 to step 810.

In step 810 the first node receives a second signal from the second node, e.g., signal $S_2$ 352 from device A 302. Operation proceeds from step 810 to step 812. In step 812 the first node measures the received power of the second signal, e.g., obtaining $RP_{S2D}$. Then in step 814 the first node estimates a second SINR at the second node for a transmission from the fourth node to the second node in the presence of a transmission from the first node to the third node using a resource also used for the transmission from the second node to the fourth node. The second estimated SINR is, e.g., $SINR_{ATA}=K/(P_D RP_{S2D})$. Operation proceeds from step 814 to step 816.

In step 816 the first node receives a third signal from the fourth node, e.g., signal $S_3$ 356 from device B 304. Operation proceeds from step 816 to step 818. In step 818 the first node measures the received power of the third signal, e.g., obtaining $RP_{S3D}$. Then, in step 820 the first node estimates a third SINR at the fourth node for a transmission from the second node to the fourth node in the presence of a transmission from the first node to the third node using a resource also used for the transmission from the second node to the fourth node. The third estimated SINR is, e.g., $SINR_{ATB}=K/(P_D RP_{S3D})$. Operation proceeds from step 820 via connecting node A 822 to step 824.

In step 824 the first node receives a fourth signal from the fourth node, e.g., signal $S_4$ 354 from node B 304. Operation proceeds from step 824 to step 826. In step 826 the first node measures the received power of the fourth signal, e.g., obtaining $RP_{S4D}$. Then in step 828 the first node estimates a fourth SINR at the first node for a transmission from the third node to the first node in the presence of a transmission from the fourth node to the second node using a resource also used for the transmission from the third node to first node. The fourth estimated SINR is, e.g., $SINR_{ATD}=P_C|h_{CD}|^2/RP_{S4D}$. Operation proceeds from step 828 to step 830.

In step 830 the first node receives SINR level information from the third node. The received SINR level information includes, e.g., a SINR level and/or an indicator. For example one or more SINR levels determined by the third node are communicated to the first node. As another example, an indicator is communicated from the third node to the first node indicating that a set of third node estimated SINRs are above threshold criteria.

In one case where uni-direction concurrent transmission are under consideration as with the example of FIG. 2, in some embodiments, one SINR value is communicated in the received SINR information or an indicator is communicated indicating whether one third node estimated SINR exceeded a threshold criteria. In another case where concurrent transmission in the same or different directions are under consideration as with the example of FIG. 3, in some embodiments, multiple, e.g., four, SINR values may be, and sometimes are communicated, in the received SINR information or an indicator is communicated indicating whether each of the multiple, e.g., each of the four, third node estimated SINRs exceeded threshold criteria.

In still another case a CID candidate list may be communicated from the third node to the first node indicating those CIDs for which estimated SINR were tested and which exceeded the threshold criteria.

Operation proceeds from step 830 to step 832. In step 832 the first node decides, based on the first estimated SINR, whether to communicate with the third node using said resource. Step 832 includes sub-steps 834 and 842. In some embodiments, step 832 also includes sub-steps 836, 838 and 840. In sub-step 834 the first node determines whether the first estimated SINR exceeds a first SINR threshold level. In sub-step 836 the first node determines whether the second estimated SINR exceeds a second SINR threshold level. In some embodiments, deciding whether to communicate with the third node using said resource is also based on the second estimated SINR. In sub-step 838 the first node determines whether the third estimated SINR exceeds a third SINR threshold level. In sub-step 840 the first node determines whether the fourth estimated SINR exceeds a fourth SINR threshold level. In some embodiments, deciding whether to communicate with the third node using said resource is also based on each of the estimated third and fourth SINRs.

In some embodiments, the first, second, third and fourth SINR threshold levels are the same value. In sub-step 842 the first node determines whether the SINR level information from the third node indicates that it is acceptable for the third node to communicate with the first node. In some embodiments, the same SINR threshold level criteria is used by both the first and third nodes. In some other embodiments, different SINR threshold level criteria are used by the first and third nodes.

In some embodiments, deciding whether to communicate with the third node using said resource includes deciding to communicate when the estimated SINR exceeds a first threshold and said received SINR level information indicates a SINR over a second threshold or that the third node has determined that an SINR determined at the third node exceeds a second threshold. The second threshold, in some embodiments, is the same as the first threshold used by the first node.

In some but not all embodiments, the same SINR threshold is used throughout the system for resource reuse decisions. In other embodiments, different SINR thresholds, used for resource reuse decisions, are associated with different nodes. In some embodiments, different SINR thresholds, used for resource reuse decisions, are associated with different connections. In some embodiments, a device uses different SINR thresholds for resource reuse decisions corresponding to different devices and/or connections.

Figure 9:
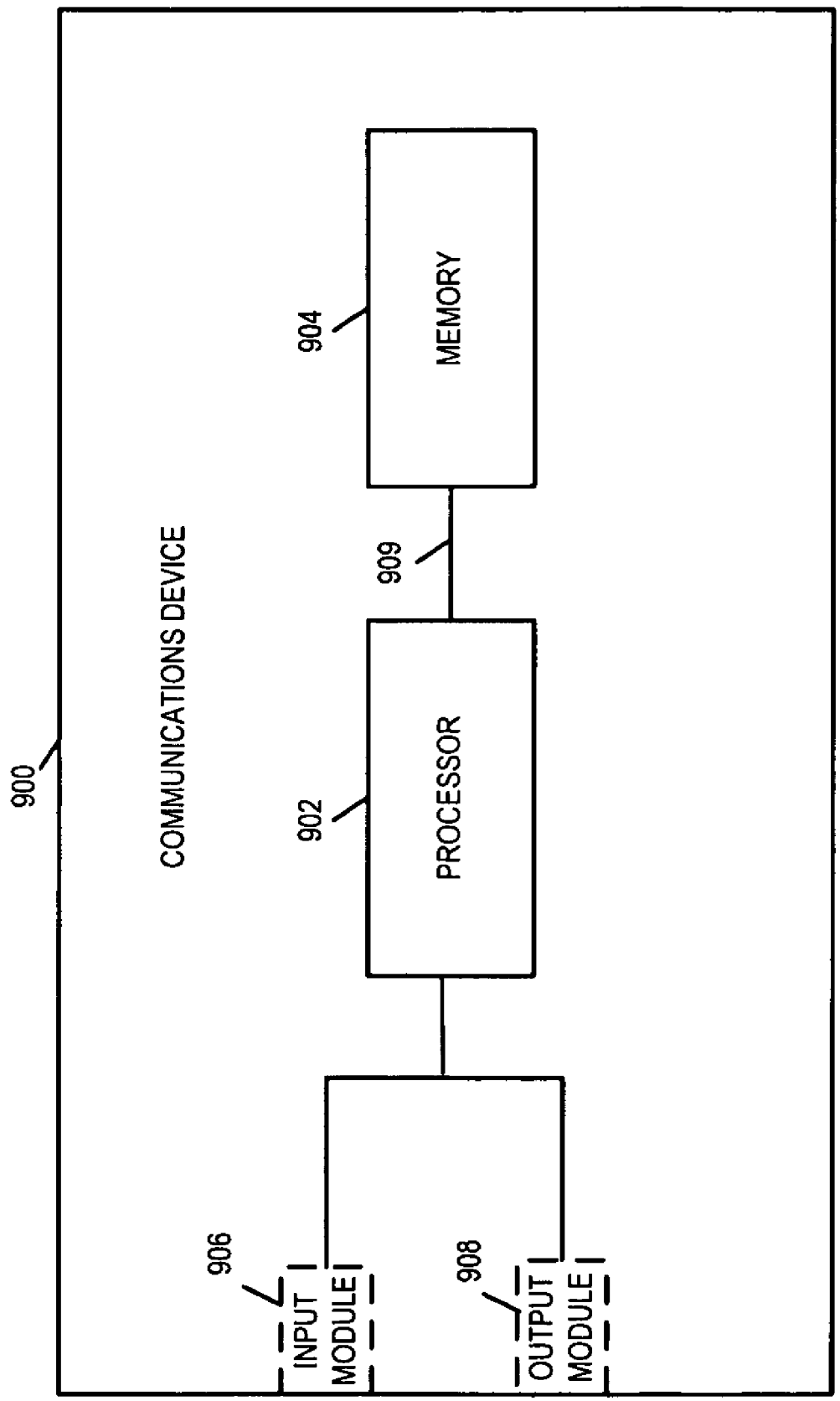
FIG. 9 is a drawing of an exemplary communications device in accordance with an exemplary embodiment.

FIG. 9 is a drawing of an exemplary communications device 900 in accordance with an exemplary embodiment. Exemplary communications device 900 is, e.g., communications device D 208 of FIG. 2 of communications device D 308 of FIG. 3. Communications device 900 may be one of the exemplary peer to peer communications devices of network 100 of FIG. 1. Exemplary communications device 900 implements a method in accordance with flowchart 800 of FIG. 8.

Communications device 900 includes a processor 902 and memory 904 coupled together via a bus 909 over which the various elements (902, 904) may interchange data and information. Communications device 900 further includes an input module 906 and an output module 908 which may be coupled to processor 902 as shown. However, in some embodiments, the input module 906 and output module 908 are located internal to the processor 902. Input module 906 can receive input signals. Input module 906 can, and in some embodiments does, include a wireless receiver and/or a wired or optical input interface for receiving input. Output module 908 may include, and in some embodiments does include, a wireless transmitter and/or a wired or optical output interface for transmitting output.

Processor 902 is configured to receive a first signal from a second node; measure the received power of the first signal; estimate a first SINR at the first node for a transmission from a third node to the first node in the presence of a transmission from a second node to a fourth node using a resource also used for the transmission from the third node to the first node; and decide based on the estimated SINR whether to communicate with the third node using said resource. In some embodiments, said first signal is a signal which was transmitted by the second node at a predetermined power level. In some embodiments, processor 902 is configured to determine if the first estimated SINR exceeds a first SINR threshold level as part of being configured to decide based on the estimated SINR.

In some embodiments, processor 902 is configured to receive SINR level information from the third node. In some such embodiments, processor 902 is configured, as part of being configured to decide whether to communicate with the third node, to base its decision on the received SINR level information.

In some embodiments, being configured to decide based on the estimated SINR whether to communicate includes being configured to decide to communicate when said estimated SINR exceeds a first threshold level and said received SINR level information indicates a SINR over a second threshold or that the third node has determined that an SINR determined at the third node exceeds a second threshold. The second threshold may be, and sometimes is, the same as the first threshold used by the first node.

Processor 902, in some embodiments, is configured to: receive a second signal from a second node; measure the received power of the second signal; and estimate a second SINR at the second node for a transmission from the fourth node to the second node in the presence of a transmission from the first node to a third node using a resource also used for the transmission from the second node to the fourth node. In some such embodiments, processor 902, as part of being configured to decide whether to communicate with the third node, is configured to base its decision on the second estimated SINR.

In some embodiments, processor 902 is configured to: receive a third signal from the fourth node; measure the received power of the third signal; and estimate a third SINR at the fourth node for a transmission from a second node to the fourth node in the presence of a transmission from first node to a third node using a resource also used for the transmission from the second node to the fourth node. In some such embodiments, processor 902 is further configured to: receive a fourth signal from a fourth node; measure the received power of the fourth signal; and estimate a fourth SINR at the first node for a transmission from a third node to the first node in the presence of a transmission from fourth node to a second node using a resource also used for the transmission from the third node to the first node. In some such embodiments, being configured to decide whether to communicate with the third node using said resource includes being configured to base the decision on each of the estimated third and fourth SINRs.

Figure 10:
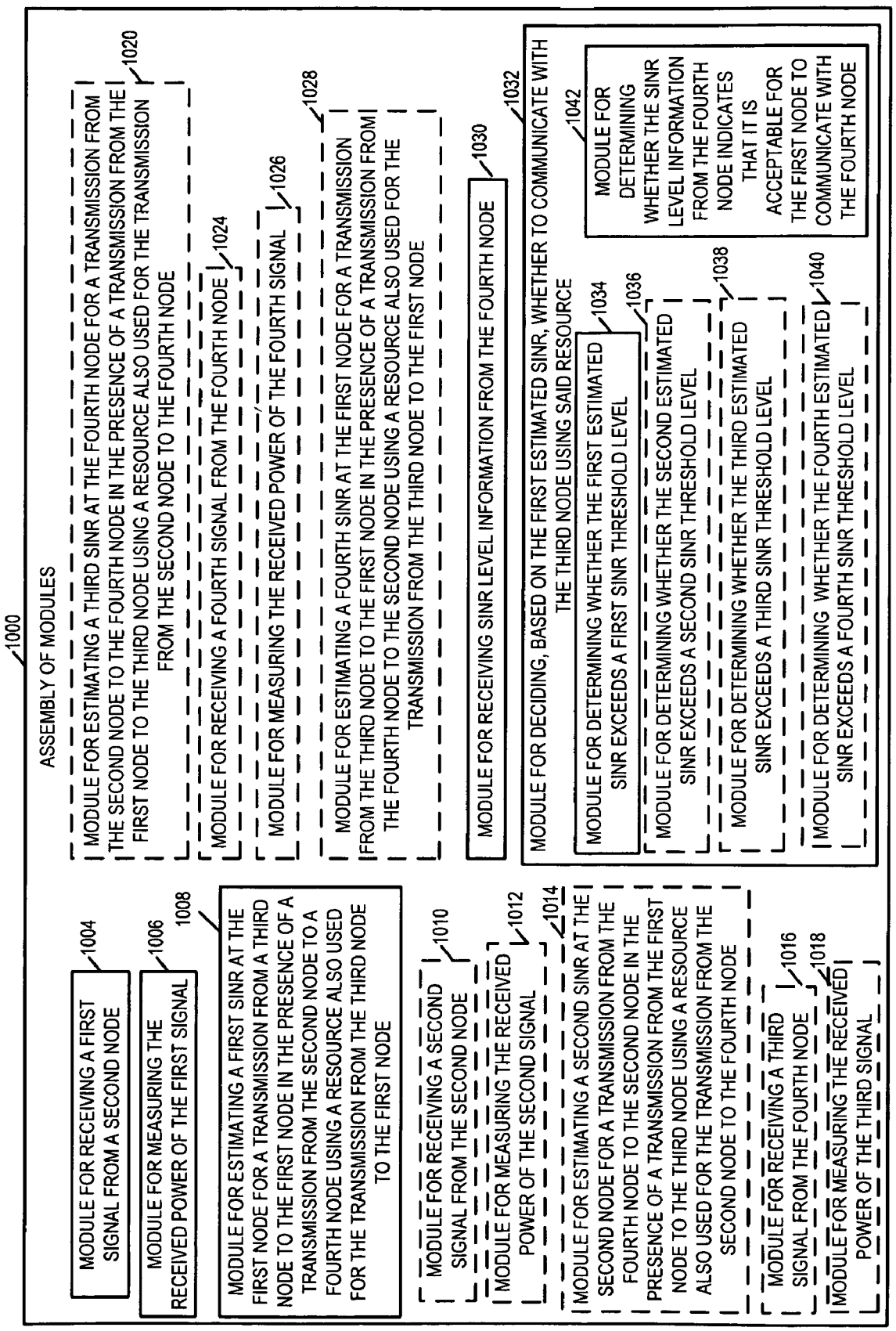
FIG. 10 is an assembly of modules which can, and in some embodiments are, used in the communications device illustrated in FIG. 9.

FIG. 10 is an assembly of modules 1000 which can, and in some embodiments are, used in the communications device 900 illustrated in FIG. 9. The modules in the assembly 1000 can be implemented in hardware within the processor 902 of FIG. 9, e.g., as individual circuits. Alternatively, the modules may be implemented in software and stored in the memory 904 of the communications device 900 shown in FIG. 9. While shown in the FIG. 9 embodiment as a single processor, e.g., computer, it should be appreciated that the processor 902 may be implemented as one or more processors, e.g., computers. When implemented in software the modules include code, which when executed by the processor, configure the processor, e.g., computer, 902 to implement the function corresponding to the module. In embodiments where the assembly of modules 1000 is stored in the memory 904, the memory 904 is a computer program product comprising a computer readable medium comprising code, e.g., individual code for each module, for causing at least one computer, e.g., processor 902, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 10 control and/or configure the communications device 900 or elements therein such as the processor 902, to perform the functions of the corresponding steps illustrated in the method flowchart 800 of FIG. 8.

Assembly of modules 1000 includes: a module 1004 for receiving a first signal from a second node, a module 1006 for measuring the received power of the first signal, a module 1008 for estimating a first SINR at the first node for a transmission from a third node to the first node in the presence of a transmission from the second node to a fourth node using a resource also used for the transmission from the third node to the first node, a module 1030 for receiving SINR level information from the fourth node, and a module 1032 for deciding, based on the first estimated SINR, whether to communicate with the third node using said resource.

In some embodiments, assembly of modules 1000 includes a module 1010 for receiving a second signal from the second node, a module 1012 for measuring the received power of the second signal, a module 1014 for estimating a second SINR at the second node for a transmission from the fourth node to the second node in the presence of a transmission from the first node to third node using a resource also used for the transmission from the second node to the fourth node, a module 1016 for receiving a third signal from the fourth node, a module 1018 for measuring the received power of the third signal, a module 1020 for estimating a third SINR at the fourth node for a transmission from a second node to the fourth node in the presence of a transmission from the first node to the third node using a resource also used for the transmission from the second node to the fourth node, a module 1024 for receiving a fourth signal from a fourth node, a module 1026 for measuring the received power of the fourth signal, and a module 1028 for estimating a fourth SINR at the first node for a transmission from the third node to the first node in the presence of a transmission from the fourth node to the second node using a resource also used for the transmission from the third node to the first node.

Module 1032 includes a module 1034 for determining whether the first estimated SINR exceeds a first SINR threshold level and a module 1042 for determining whether the SINR level information from the fourth node indicates that it is acceptable for the first node to communicate with the fourth node. In some embodiments, module 1032 further includes one or more of: a module 1036 for determining whether the second estimated SINR exceeds a second SINR threshold level, a module 1038 for determining whether the third estimated SINR exceeds a third SINR threshold level and a module 1040 for determining whether the fourth estimated SINR exceeds a fourth SINR threshold level.

In some embodiments, the first signal is a signal which was transmitted by the second node at a predetermined power level. In various embodiments, the module 1032 for deciding, based on the first estimated SINR, whether to communicate with the third node using said resource decides to communicate when said first estimated SINR exceeds a first threshold level and said received SINR level information indicates a SINR over a second threshold or that the third node has determined that an SINR determined at the SINR exceeds a second threshold level. In some embodiments, the second threshold level is the same as the first threshold level used by the first node.

The module 1032 for deciding whether to communicate with the third node using said resource, in some embodiments, also bases its decision on the second estimated SINR. The module 1032 for deciding whether to communicate with the third node using said resource, in some embodiments, bases its decision on each of the estimated third and fourth SINRs.

Various features and/or aspects relating to some embodiments will now be described. One problem that some embodiments address is that of facilitating spatial reusing of a given wireless resource across different wireless links. Consider an example of two links A-B and C-D. One may like to determine whether these links should reuse a given wireless resource simultaneously. The criterion for reusing the resource, in some embodiments, includes evaluating expected SINR seen for each of the links. Now consider that the links are uni-directional links, e.g., a A->B link and A C->D link, and consider that the uni-directional links are to reuse the resource simultaneously, then the SINR seen by A->B would be $$\frac{P_A|h_{AB}|^2}{P_C|h_{BC}|^2},$$

and the SINR seen by C->D would be $$\frac{P_C|h_{CD}|^2}{P_A|h_{AD}|^2}.$$

One would like to know that both these SINRs are expected to be above a certain threshold, e.g., 20 db, for them to reuse the resource.

In one approach, a two block broadcast structure is implemented. If a certain link is using a certain wireless resource, e.g., it is an established link having an associated CID, then we use a control channel where the link broadcasts information. In some embodiments, the number of tones used for the control channel is at least twice the number of available wireless resources. A link using a particular wireless resource transmits energy on two of those tones. The two tones are dedicated for that wireless resource. In some embodiments, a multiple of such two tones may be, and sometimes are, dedicated for a given wireless resource.

On a first one of the tones the energy is proportional to the power used by the transmitter and the energy is sent by the transmitter. Consider that node A transmits on the first tone with power level $P_A$. This information is used by the receivers of other wireless links potentially interested in reusing the resource to calculate the SINR that the link will see due to the presence of the first link. A link interested in reusing the resource will determine that the estimated SINR is at least a threshold limit, e.g., at least 20 db, before reusing the link.

For example, consider that A->B is an active connection. Further consider that C->D connection is trying to decide whether to reuse the resource. Device D measures the received power, e.g., obtaining $P_A|h_{AD}|^2$, and determines if $$\frac{P_C|h_{CD}|^2}{P_A|h_{AD}|^2}$$

is at least a threshold limit, e.g., at least 20 db. This test condition should be satisfied to allow reuse of the link. It should be noted that D knows $P_C|h_{CD}|^2$.

On a second one of the tones the energy is inversely proportional to the power received by the receiver and the energy is sent by the receiver of the active link. Consider that node B transmits on the second one of the tones at power level $K/(P_A|h_{AB}|^2)$, where K is a known constant. This information is used by the transmitters of other wireless links potentially interested in reusing the resource to calculate the estimated SINR that the existing link will see due to the new link. A new links will verify that the estimated SINR is at least a threshold limit, e.g., at least 20 db for the existing link before reusing the link.

C measures the received power of the signal on the second one of the tones which is $(K|h_{BC}|^2)/(P_A|h_{AB}|^2)$ and uses that information to determine if $$\frac{P_A|h_{AB}|^2}{P_C|h_{BC}|^2}$$

is at least a threshold limit, e.g., at least 20 db. This condition should be satisfied to allow reuse of the resource by the new link. The energy measured by C when B transmits is proportional to $$\frac{|h_{BC}|^2}{P_A|h_{AB}|^2},$$

and the value K is known. C also knows $P_C$. In some embodiments, for the new link C->D to be allowed to reuse the resource of existing link A->B, both the first estimated SINR test performed by device D and the second estimated SINR test performed by device C, should both pass, e.g., both estimated SINRs are at least 20 dBs.

Figure 11:
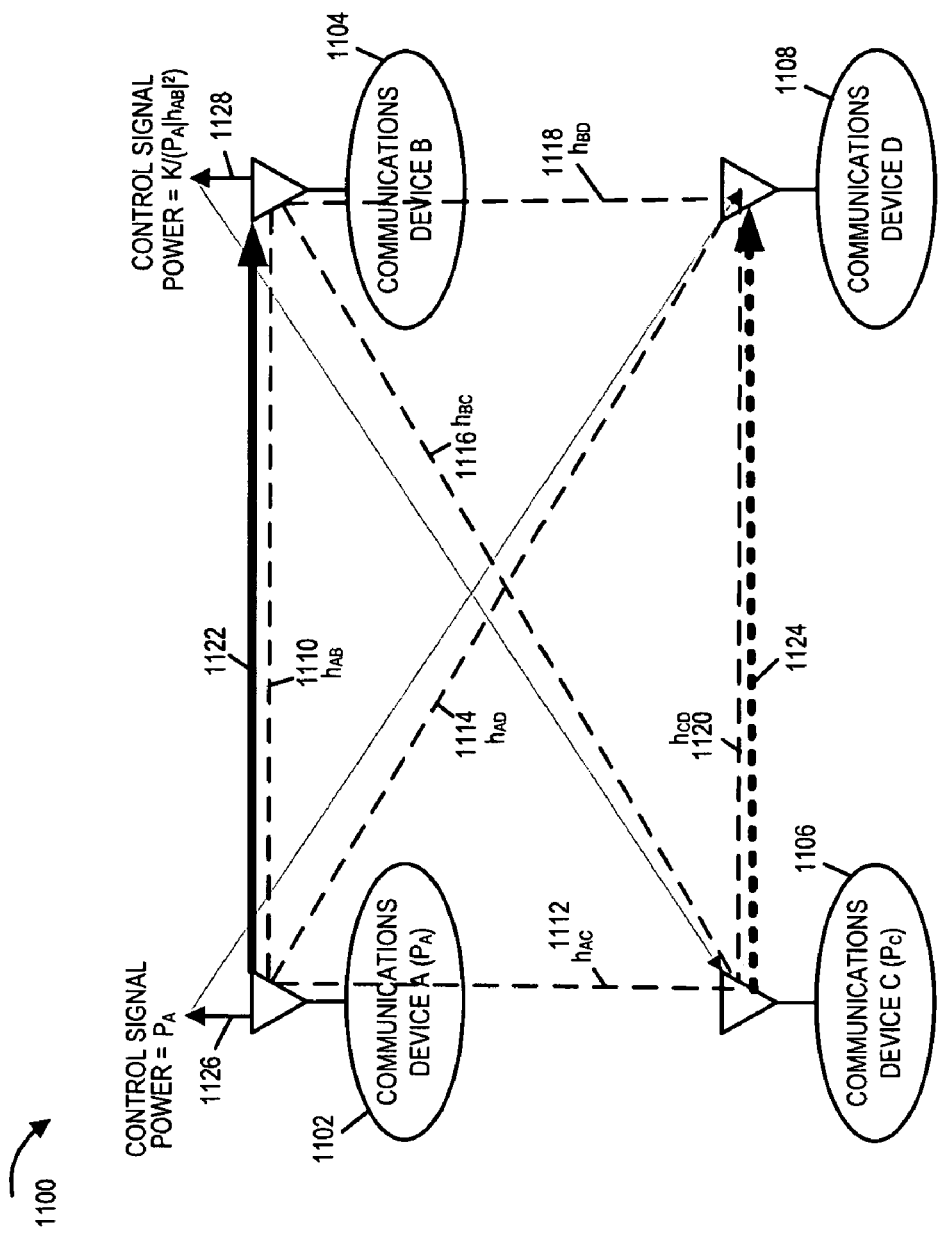
FIG. 11 includes drawing which illustrates an example of a uni-directional resource case.

FIG. 11 includes drawing 1100 which illustrates an example of a uni-directional resource case. Communications device A 1102 and communications device B 1104 are nodes of an existing active connection A->B which has an associated uni-direction resource for communicating data and/or information in the direction from device A to device B. Communications device C 1106 and communications device D 1108 are nodes of a potential connection C->D which would like to simultaneously use the A->B uni-direction resource for communicating data and/or information in the direction from device C to device D. There are channels between the various combinations of device pairs ($h_{AB}$ 1110, $h_{AC}$ 1112, $h_{AD}$ 1114, $h_{BC}$ 1116, $h_{BD}$ 1118, $h_{CD}$ 1120).

Communications device A 1102 transmits a control signal 1126 at power level $P_A$ which is received and measured by communications device D 1108. Communications device D 1108, which knows the channel $h_{CD}$ 1120 and power level $P_C$, uses the measured information to calculate an expected SINR at device D should a transmission from device C to device D occur in the presence of a transmission from device A to device B using the shared resource of interest. The estimated SINR is compared to a threshold value.

Communications device B 1104 transmits a control signal 1128 at power level=$K/(P_A|h_{AB}|^2)$ which is received and measured by communications device C 1106. Communications device C 1106, which knows the channel $h_{CD}$ 1120, power level $P_C$, and value of constant K, uses the measured information to calculate an expected SINR at device B should a transmission from device A to device B occur in the presence of a transmission from device C to device D using the shared resource of interest. The estimated SINR is compared to a threshold criteria. If both the device C estimated SINR and the device D estimated SINR are greater than or equal to the threshold value then the C->D connection is allowed to use the resource.

Devices (1102, 1104, 1106, 1108) of FIG. 11 are, e.g., devices (202, 204, 206, 208) of FIG. 2. In FIG. 2, resource reusage is described in the context of a connection identifier with associated resources. In general, the methods and apparatus of various embodiments are also applicable to other resources, e.g., a traffic segment under contention.

The approach described above for a uni-direction resource can be extended to a bi-directional resource.

If the resource being potentially reused can be used by a wireless link in both directions, then a similar but modified approach can be implemented. In this case, in the control channel each device of the existing active connection sends energy on two tones. Thus a total of four tones are used to send control signals used to estimate SINRs. For each active connection device, the energy in one of the tones is proportional to power used by the device to transmit, and the energy in the other tone is inversely proportional to power received from the other device of its connection. These quantities are used to estimate that for each of the various combinations possible, which are a total of 8, the SINR is at least a predetermined limit value, e.g., at least 20 dbs.

Consider an example, where A<- ->B is an active connection, and C<- ->D is trying to reuse the resource. Consider that node A transmits a control signal on a first tone at power level $P_A$ and that node B transmits a control signal on second tone at power level $P_B$. Device C and device D receive the transmitted signals, estimate SINRs and test the SINRs to a threshold.

C estimates SINRs and verifies that
$min(P_D*|h_{CD}|^2/(P_A*|h_{AC}|^2), P_D*|h_{CD}|^2/(P_B*|h_{BC}|^2))$ is $>$ a threshold limit, e.g., >20 db D estimates SINRs and verifies that
$min(P_C*|h_{CD}|^2/(P_A*|h_{AD}|^2), P_C*|h_{CD}|^2/(P_B*|h_{BD}|^2))$ >a threshold limit, e.g., >20 db Further consider that node A transmits a control signal on a third tone at power level $K/(P_B|h_{AB}|^2)$ and that node B transmits a control signal on fourth tone at power level $K/(P_A|h_{AB}|^2)$. Device C and device D receive the transmitted signals, estimate SINRs and test the SINRs to a threshold.

C estimates SINRs and verifies that
$min(P_A*|h_{AB}|^2/(P_C*|h_{BC}|^2), P_B*|h_{AB}|^2/(P_C*|h_{AC}|^2))$ is >a threshold value, e.g., >20 db D estimates SINRs and verifies that
$min(P_A*|h_{AB}|^2/(P_D*|h_{BD}|^2), P_B*|h_{AB}|^2/(P_D*|h_{AD}|^2))$ is >a threshold value, e.g., >20 dB.

Figure 12:
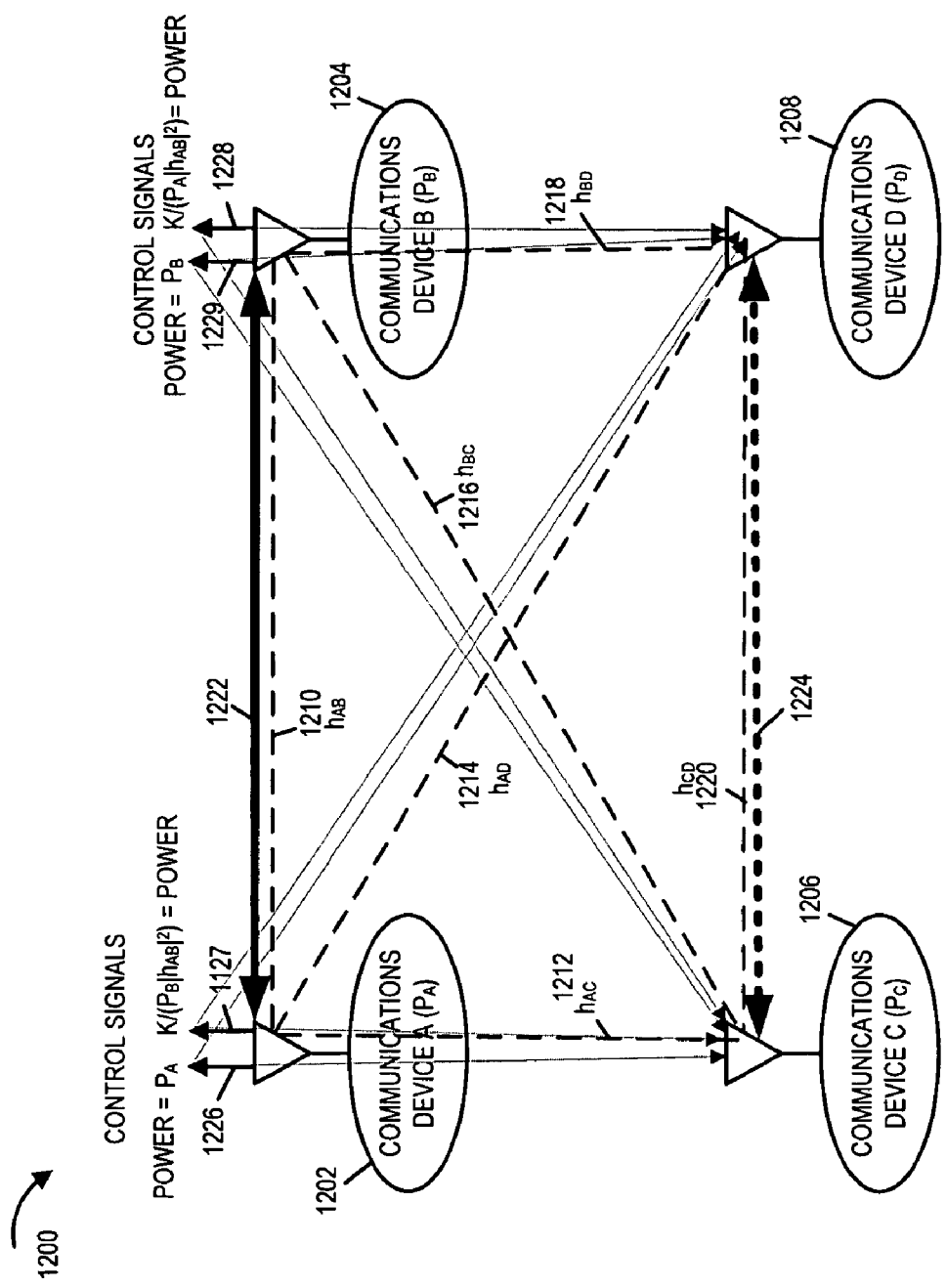
FIG. 12 includes drawing which illustrates an example of a bi-directional resource case.

FIG. 12 includes drawing 1200 which illustrates an example of a bi-directional resource case. Communications device A 1202 and communications device B 1204 are nodes of an existing active connection A<- ->B which has an associated bi-direction resource for communicating data and/or information between devices A and B in either direction. Communications device C 1206 and communications device D 1208 are nodes of a potential connection C<- ->D which would like to simultaneously use the A<- ->B bi-direction resource for communicating data and/or information between device C and device D in either direction. There are channels between the various combinations of device pairs ($h_{AB}$ 1210, $h_{AC}$ 1212, $h_{AD}$ 1214, $h_{BC}$ 1216, $h_{BD}$ 1218, $h_{CD}$ 1220).

Communications device A 1202 generates and transmits control signal with power level $P_A$ 1226 and a control signal with power level $K/(P_B|h_{AB}|^2)$ 1227. Communications device B 1204 generates and transmits control signal with power level $P_B$ 1229 and a control signal with power level $K/(P_A|h_{AB}|^2)$ 1228. Device C 1202 and device D 1208 receive and measure the transmitted control signals (1226, 1227, 1229, 1228). Devices C 1202, which know the power levels $P_C$, $P_D$, $h_{CD}$ and the value of constant K, uses its measurements of control signals to calculate four estimated SINRs should concurrent use of the resource of interest occur. The estimated SINRs are compared to a threshold criteria value. Devices D 1208, which knows the power levels $P_C$, $P_D$, $h_{CD}$ and the value of constant K, uses its measurements of control signals to calculate four estimated SINRs should concurrent use of the resource of interest occur. The estimated SINRs are compared to a threshold criteria value. If each of eight estimated SINRs are equal to or greater than the threshold criteria value, e.g., 20 dBs, then potential connection C<- ->D is allowed to use the resource of interest concurrently with the A<- ->B connection.

Devices (1202, 1204, 1206, 1208) of FIG. 12 are, e.g., devices (302, 304, 306, 308) of FIG. 3. In FIG. 3, resource reusage is described in the context of a connection identifier with associated air link resources. In general the methods and apparatus of various embodiments are also applicable to other resources, e.g., a traffic segment under contention.

Figure 13:
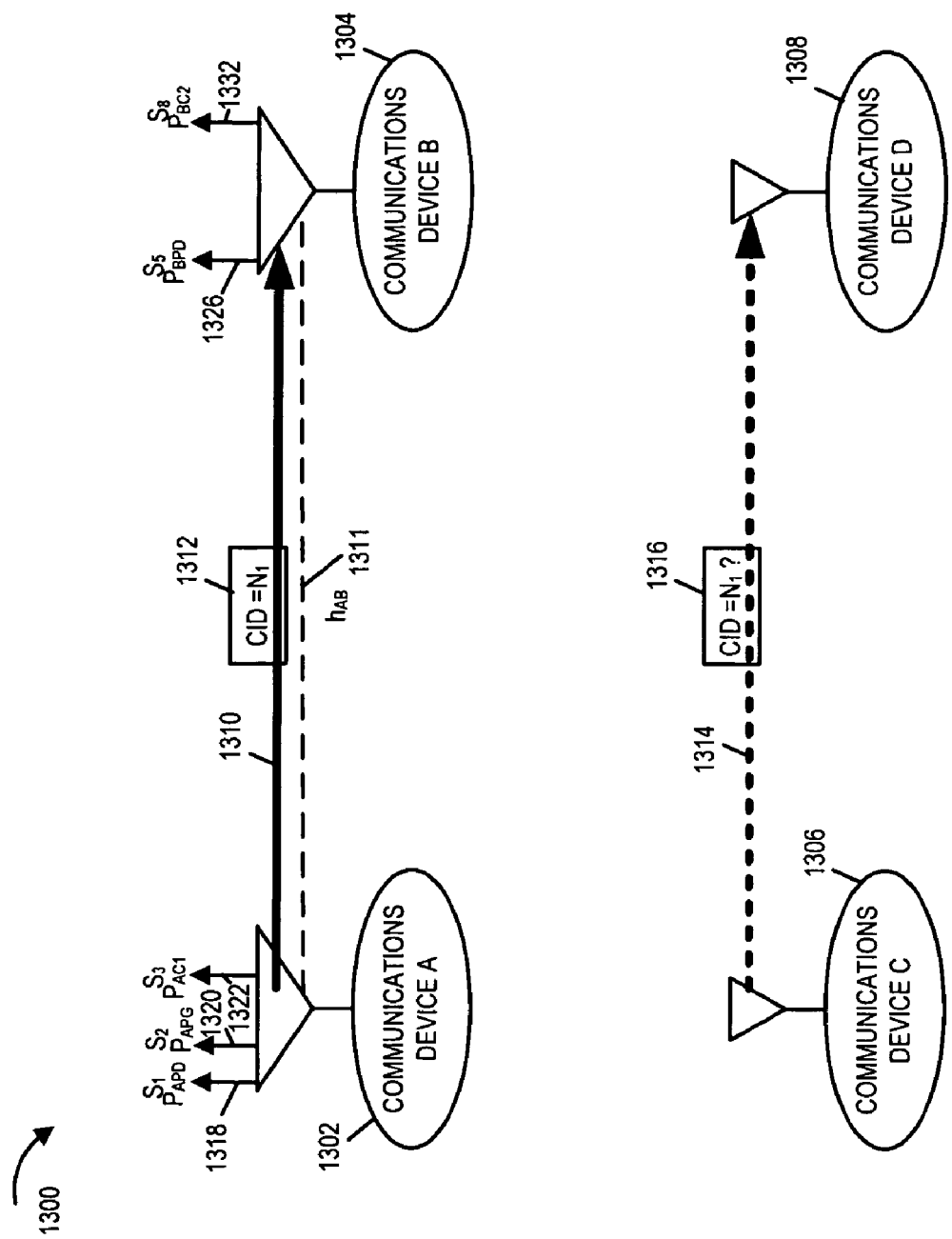
FIG. 13 is a drawing illustrating four exemplary wireless communications devices and is used to describe features of some embodiments.

FIG. 13 is a drawing 1300 illustrating four exemplary wireless communications devices (communications device A 1302, communications device B 1304, communications device C 1306, communications device D 1308) and is used to describe features of some embodiments. In the example of FIG. 13, device A 1302 and device B 1304 have an existing connection, as indicated by solid line uni-direction arrow 1310, corresponding to currently held connection identifier 1312, which is CID=$N_1$, e.g., where $N_1$ is an integer value in the range 1 . . . 168. In the timing structure being utilized for the example, there is a set of air link resources associated with CID=$N_1$. Devices (1302, 1304, 1306, 1308) are part of a peer to peer communications system in which at least some resources may be, and sometimes are, used concurrently by multiple connections, e.g., depending upon interference conditions. For example, if the first device pair (device A 1302, device B 1304) is far away from second device pair (device C 1306, device D 1308), then the interference levels may be sufficiently low enough that concurrent transmissions may be allowed to occur on the same air link resource. Devices (1302, 1304, 1306, 1308) are, e.g., peer to peer devices of network 100 of FIG. 1.

In this example, device C 1306 and device D 1308 would like to have a connection, as indicated by dotted line arrow 1314, and would like to check if they can use the same connection identifier currently held by the device A 1302/device B 1304 connection, as indicated by block 1316. In this example, we are concerned about one way communications from device A 1302 to device B 1304 and one way communications from device C 1306 to device D 1308. Therefore, we are concerned about potential interference from a device C 1306 transmission impacting device B's 1304 ability to successfully recover a signal from device A 1302. In such a scenario, we are also concerned about potential interference from a device A 1302 transmission impacting device D's 1308 ability to successfully recover a signal from device C 1306.

In accordance with one feature of some embodiments, communications devices of existing connections transmit control signals available for use by potential connection wireless devices to estimate expected SINRs should both the current connection and the potential connection use the same air link resources concurrently. In this example, communications device A 1302 transmits control signal $S_3$ 1322 at power level $P_{AC1}$. Communications device B 1304 transmits control signal $S_8$ 1332 at power level $P_{BC2}$. Device C 1306 receives and measures signal $S_8$ 1332, and estimates an expected SINR at communications device B 1304 should concurrent resource usage occur. Device D 1308 receives and measured signal $S_3$ 1322, and estimates an expected SINR at communications device D 1308 should concurrent resource usage occur. Based on the determined estimated SINRs, device C 1306 and/or device D 1308 make a decision as whether or not a connection 1314 can be established using the same CID as connection 1310, e.g., both existing and new connection use $CID=N_1$. In one embodiment, for the potential connection to be allowed to reuse the resource of interest, both SINRs should be equal to or greater than a threshold limit criteria, e.g., 20 dBs.

In some embodiments, control signal $S_3$ 1322 and control signal $S_8$ 1332 are single tone OFDM signals. In some such embodiments, controls signals $S_3$ 1322 and $S_8$ 1332 are conveyed during a connection identifier broadcast interval on specific resources associated with the connection, e.g., on specific OFDM tone-symbol transmission units in a CID broadcast air link resource associated with the existing connection. For example two distinct OFDM tone-symbols in the CID broadcast air link resource are used, one for each signal.

Communications device A 1302 also transmits a peer discovery signal $S_1$ 1318 at power level $P_{APD}$ and a paging signal $S_2$ 1320 at power level $P_{APG}$. In addition communications device B 1304 transmits a peer discovery signal $S_5$ 1326 at power level $P_{BPD}$. In various embodiments, at least one of a peer discovery signal and a paging signal is multi-tone signal. In some embodiments, the peer discovery signals ($S_1$ 1318, $S_5$ 1326) and the paging signal ($S_2$ 1320) precede the control signals ($S_3$ 1322, $S_8$ 1332). In some embodiments, the transmission power levels of the control signals $S_3$ 1322 and $S_8$ 1332 are based on the power levels of one or more of the peer discovery and/or paging signals (1318, 1320, 1326).

One exemplary implementation will now be described.

Pmax=a maximum power level that a device can transmit, e.g., 23 dbm.

$h_{AB}$=the channel gain from device A to device B, as indicated by dashed line 1311 in FIG. 13.

$P_{Thermal}$=thermal noise power level.

$P_{APD}$=device A's peer discovery power.

$P_{APG}$=device A's paging power.

$P_{AC1}$=device A's control signal power.

$P_{BPD}$=device B's peer discovery power.

$P_{BC2}$=device B's control signal power level.

The various quantities at device A are determined as follows.

1. $P_{APD}$=Pmax.
2. For defining $P_{APG}$, let's define an intermediary entity $P_A'$ as $$P_A'^* |h_{AB}|^2 = 1000(P_{Thermal}).$$

$P_A'$ can be computed through $h_{AB}$ measured via the peer discovery received power. 1000 represents 30 db over thermal. In some other embodiments, a different gain value is used instead of 1000, e.g., 100.

Then the paging power is defined as $$P_{APG} = \min(\sqrt{(P_A'^* P\max)}, P\max)$$

3. $P_{AC1} = P_{APG}$

The various quantities at device B are determined as follows.

1. $P_{BPD}$=Pmax
2. $P_{BC2}=K/(P_{APG}^* |h_{AB}|^2)$, where K is a known constant and where $P_{APG}^* |h_{AB}|^2$ can be either (i) measured from the received paging signal of A or (ii) can be inferred directly from a $h_{AB}$ measurement in peer discovery since $P_{APG}$ can be inferred from $h_{AB}$.

Figure 14:
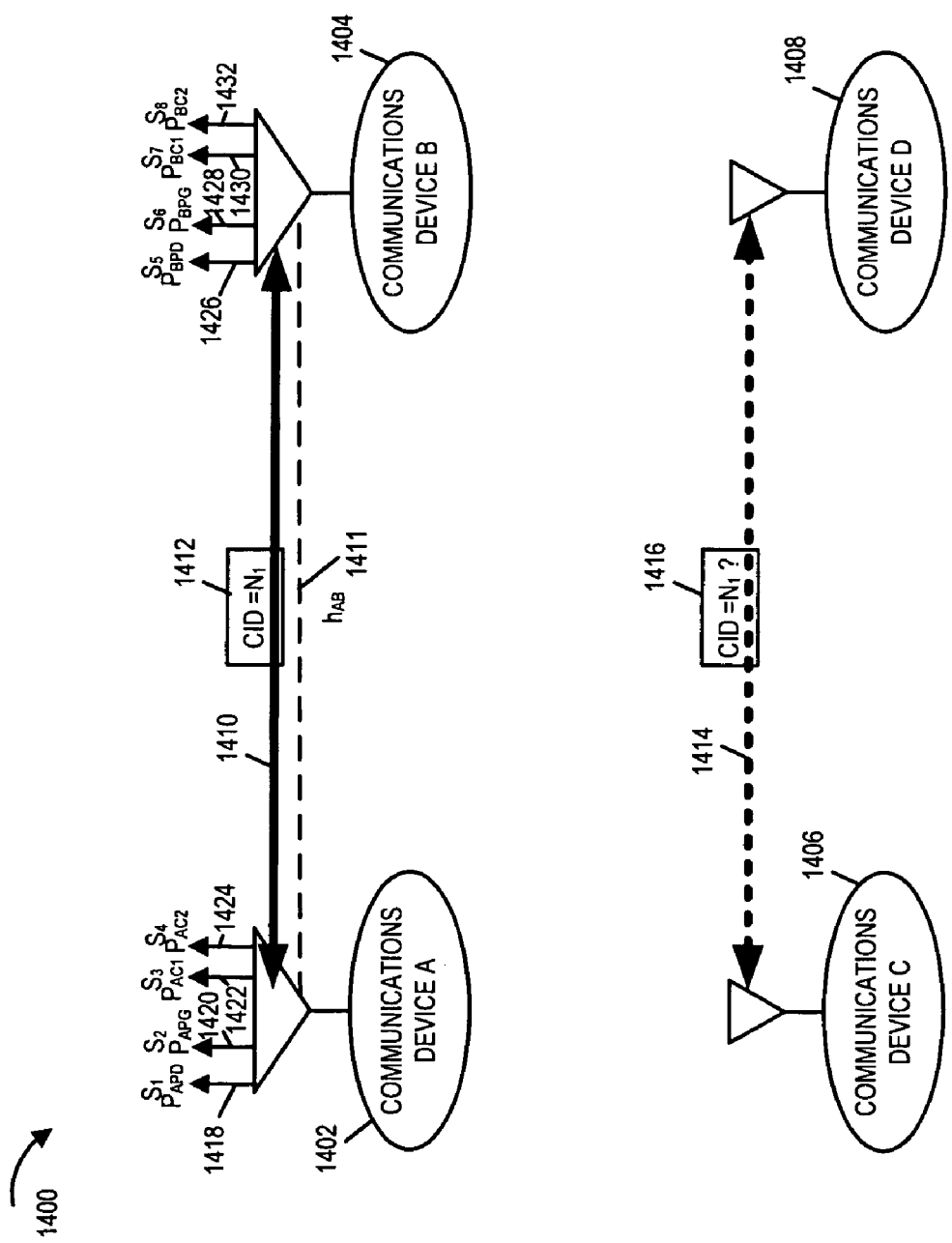
FIG. 14 is a drawing illustrating four exemplary wireless communications devices and is used to describe features of some embodiments.

FIG. 14 is a drawing 1400 illustrating four exemplary wireless communications devices (communications device A 1402, communications device B 1404, communications device C 1406, communications device D 1408) and is used to describe features of some embodiments. In the example of FIG. 14, device A 1402 and device B 1404 have an existing connection, as indicated by solid line bi-directional arrow 1410, corresponding to currently held connection identifier 1412, which is $CID=N_1$, e.g., where $N_1$ is an integer value in the range 1 . . . 168. In the timing structure being utilized for the example, there is a set of air link resources associated with $CID=N_1$. Devices (1402, 1404, 1406, 1408) are part of a peer to peer communications system in which at least some resources may be, and sometimes are, used concurrently by multiple connections, e.g., depending upon interference conditions. For example, if the first device pair (device A 1402, device B 1404) is far away from second device pair (device C 1406, device D 1408), then the interference levels may be sufficiently low enough that concurrent transmissions may be allowed to occur on the same air link resource. Devices (1402, 1404, 1406, 1408) are, e.g., peer to peer devices of network 100 of FIG. 1.

In this example, device C 1406 and device D 1408 would like to have a connection, as indicated by dotted line bi-directional arrow 1414, and would like to check if they can use the same connection identifier currently held by the device A 1402/device B 1404 connection, as indicated by block 1416. In this example, we are concerned about two way communications between device A 1402 and device B 1404 and two way communications between device C 1406 and device D 1408. When considering a common resource that may be used concurrently by two connections, signals from device A 1402 may cause interference to device D 1408 recovery of signals from device C 1406, and signals from device D 1408 may cause interference to device A 1402 recovery of signals from device B 1404. Also, when considering a common resource that may be used concurrently by two connections, signals from device B 1404 may cause interference to device C 1406 recovery of signals from device D 1408, and signals from device C 1406 may cause interference to device B 1404 recovery of signals from device A 1402. In addition, signals from device A 1402 may cause interference to device C 1406 recovery of signals from device D 1408, and signals from device C 1406 may cause interference to device A 1402 recovery of signals from device B 1404. In addition, signals from device B 1404 may cause interference to device D 1408 recovery of signals from device C 1406, and signals from device D 1408 may cause interference to device B 1404 recovery of signals from device A 1402.

In accordance with one feature of some embodiments, communications devices of existing connections transmit control signals available for use by potential connection wireless devices to estimate expected SINRs should both the current connection and the potential connection use the same air link resources concurrently. In this example, communications device A 1402 transmits control signal $S_3$ 1422 at power level $P_{AC1}$ and control signal $S_4$ 1424 at power level $P_{AC2}$. Communications device B 1404 transmits control signal $S_7$ 1430 at power level $P_{BC1}$ and signal $S_8$ 1432 at power level $P_{BC2}$.

Device C 1406 receives and measures signals $S_3$ 1422, $S_4$ 1424, $S_7$ 1430 and $S_8$ 1432 and estimates four SINRs based on its measurements. Similarly, device D 1408 receives and measures signals $S_3$ 1422, $S_4$ 1424, $S_7$ 1430 and $S_8$ 1432 and estimates four SINRs based on its measurements. Based on the determined estimated SINRs, device C 1406 and/or device D 1408 make a decision as whether or not a connection 1414 can be established using the same CID as connection 1410, e.g., both existing and new connection use CID=$N_1$. In one embodiment, for the potential connection to be allowed to reuse the resource of interest, each of the eight SINRs should be equal to or greater than a threshold limit criteria, e.g., 20 dBs.

In some embodiments, control signal $S_3$ 1422, control signal $S_4$ 1424, control signal $S_7$ 1430 control signal $S_8$ 1432 are single tone OFDM signals. In some such embodiments, controls signals $S_3$ 1422, $S_4$ 1424, $S_7$ 1430 $S_8$ 1432 are conveyed during a connection identifier broadcast interval on specific resources associated with the connection, e.g., on specific OFDM tone-symbol transmission units in a CID broadcast air link resource associated with the existing connection. For example four distinct OFDM tone-symbols in the CID broadcast air link resource are used, one for each signal.

Communications device A 1402 also transmits a peer discovery signal $S_1$ 1418 at power level $P_{APD}$ and may, and sometimes does, transmit a paging signal $S_2$ 1420 at power level $P_{APG}$. In addition communications device B 1404 transmits a peer discovery signal $S_5$ 1426 at power level $P_{BPD}$ and may, and sometimes does, transmit a paging signal $S_6$ 1428 at power level $P_{BPG}$. In various embodiments, at least one of a peer discovery signal and a paging signal is multi-tone signal. In some embodiments, the peer discovery signals ($S_1$ 1418, $S_5$ 1426) and the paging signal or signals ($S_2$ 1420 and/or $S_6$ 1428) precede the control signals ($S_3$ 1422, $S_4$ 1424, $S_7$ 1430 $S_8$ 1432). In some embodiments, the transmission power levels of the control signals $S_3$ 1422, $S_4$ 1424, $S_7$ 1430 and $S_8$ 1432 are based on the power levels of one or more of the peer discovery and/or paging signals (1418, 1420, 1426, 1428).

One exemplary implementation will now be described.
$P_{max}$=a maximum power level that a device can transmit, e.g., 23 dbm.
$h_{AB}$=the channel gain from device A to device B, as indicated by dashed line 1411 in FIG. 14.
$P_{Thermal}$=thermal noise power level.
$P_{APD}$=device A's peer discovery power.
$P_{APG}$=device A's paging power.
$P_{AC1}$=device A's first control signal power.
$P_{AC2}$=device A's second control signal power.
$P_{BPD}$=device B's peer discovery power.
$P_{BPG}$=device B's paging power.
$P_{BC1}$=device B's first control signal power.
$P_{BC2}$=device B's second control signal power.

The various quantities at device A are determined as follows.
1. $P_{APD}$=Pmax
2. For defining $P_{APG}$, let's define an intermediary entity $P_A'$ as $$P_A'^*|hAB|2=1000(P_{Thermal})$$

$P_A'$ can be computed through $h_{AB}$ measured via the peer discovery received power. 1000 represents 30 db over thermal. In some other embodiments, a different gain value is used, e.g., 100 instead of 1000. Then the paging power is defined as $$P_{APG}=\min(\sqrt{(P_A'^*P\max)},P\max)$$

3. $P_{AC1}=P_{APG}$
4. $P_{AC2}=K/(P_{BPG}^*|h_{AB}|^2)$, where K is a known constant and where $P_{BPG}^*|h_{AB}|^2$ can be either (i) measured from the received paging signal of B or (ii) can be inferred directly from a $h_{AB}$ measurement in peer discovery since $P_{BPG}$ can be inferred from $h_{AB}$.

The various quantities at device B are determined as follows.
1. $P_{BPD}$=Pmax
2. For defining $P_{BPG}$, let's define an intermediary entity $P_B'$ as $$P_B'^*|h_{AB}|^2=1000(P_{Thermal})$$

$P_B'$ can be computed through $h_{AB}$ measured via the peer discovery
received power. 1000 represents 30 db over thermal. In some other embodiments, a different gain value is used, e.g., 100 instead of 1000. Then the paging power is defined as $$P_{BPG}=\min(\sqrt{(P_B'^*P\max)},P\max)$$

3. $P_{BC1}=P_{BPG}$
4. $P_{BC2}=K/(P_{APG}^*|h_{AB}|^2)$, where K is a known constant and where $P_{APG}^*|h_{AB}|^2$ can be either (i) measured from the received paging signal of A or (ii) can be inferred directly from a $h_{AB}$ measurement in peer discovery since $P_{APG}$ can be inferred from $h_{AB}$.

Figure 15:
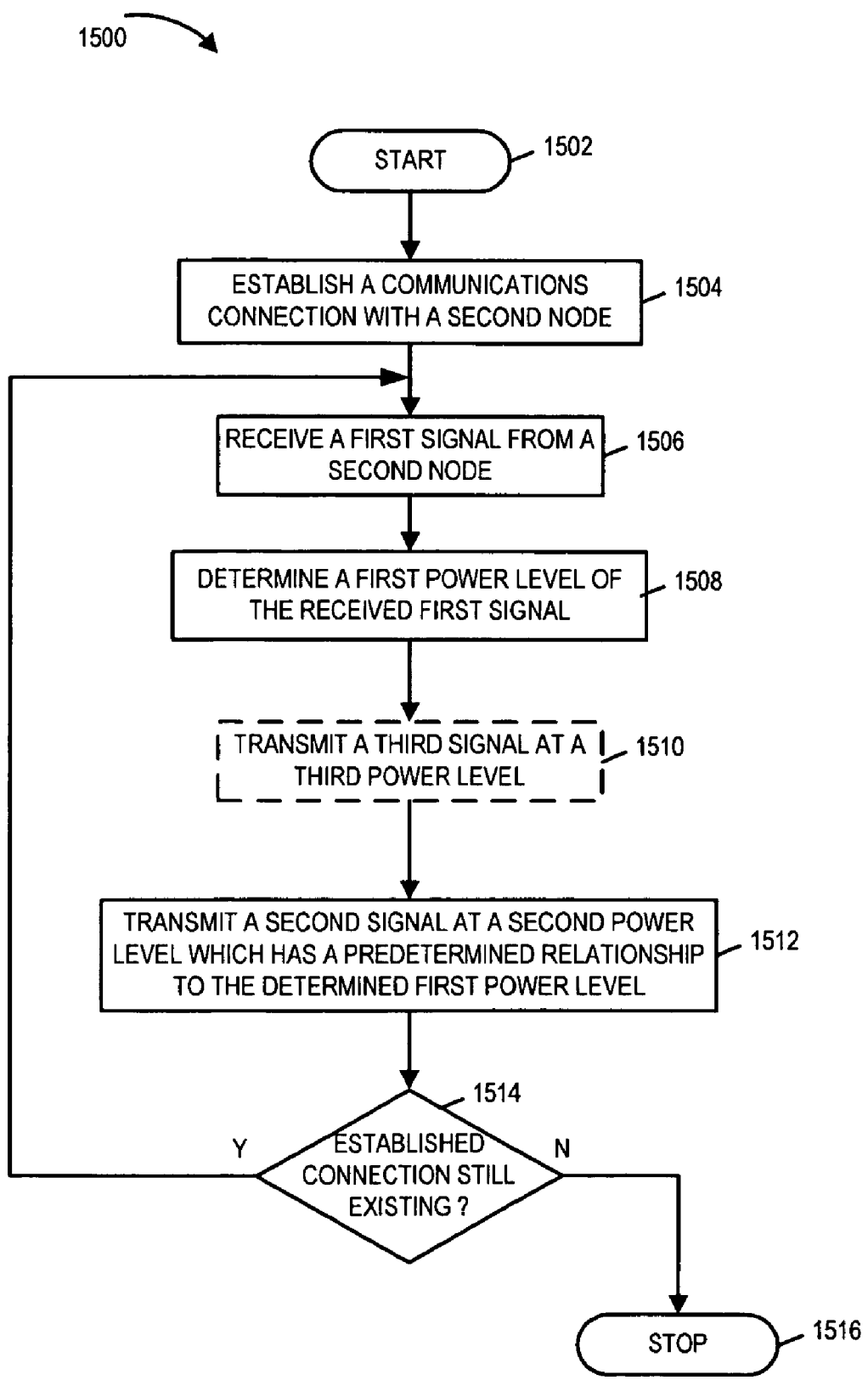
FIG. 15 is a flowchart of an exemplary communications method implemented in a first node in accordance with an exemplary embodiment.

FIG. 15 is a flowchart 1500 of an exemplary communications method implemented in a first node in accordance with an exemplary embodiment. The exemplary first node is, e.g., one of communications device A 1302 of FIG. 13, communications device B 1304 of FIG. 13, communications device A 1402 of FIG. 14 and communications device B 1404 of FIG. 14. The exemplary first node may be one of the peer to peer communications devices of network 100 of FIG. 1. Operation of the exemplary method starts in step 1502, where the first node is powered on and initialized. Operation proceeds from start step 1502 to step 1504. In step 1504 the first node establishes a communications connection with a second node. Operation proceeds from step 1504 to step 1506.

In step 1506 the first node receives a first signal from the second node. In some embodiments, the first signal is one of a peer discovery signal or a paging signal. Operation proceeds from step 1506 to step 1508. In step 1508 the first node determines a first power level of the received first signal. In some embodiments, the first signal is transmitted on multiple tone-symbols, said first power level being an average per tone-symbol power level. In various embodiments, a tone-symbol is a time-frequency airlink resource unit of one tone for one symbol transmission time interval. In some embodiments, the multiple tone-symbols on which the first signal is transmitted include tone-symbols corresponding to different symbol transmission time periods.

In some embodiments, e.g., a uni-directional resource reuse case, operation proceeds from step 1508 to step 1512. In other embodiments, e.g., a bi-directional resource reuse case, operation proceeds from step 1508 to step 1510. In step 1510 the first node transmits a third signal at a third power level. In some embodiments, the third power level is a power level having a predetermined relationship to the first power level. In some embodiments, the third signal is a single tone signal, e.g., a single tone OFDM signal communicated on one OFDM tone-symbol. Operation proceeds from step 1510 to step 1512.

In step 1512 the first node transmits a second signal at a second power level which has a predetermined relationship to the determined first power level. In some embodiments, the predetermined relationship is that the second power level is inversely proportional to the first power level. The second signal, in some embodiments, is a single tone signal, e.g., a single tone OFDM signal communicated on one OFDM tone-symbol. Operation proceeds from step 1512 to step 1514. In step 1514 the first node determines if the established connections still exists. If the established communications connection still exists, then operation proceeds from step 1514 to step 1506. In step 1506 the first node receives another first signal from the second node. However, if the established connection no longer exists, operation proceeds from step 1514 to stop step 1516.

As one example, consider that the first node is communications device B 1304 of FIG. 13 and the second node is communications device A 1302 of FIG. 13, then the first signal is received peer discovery signal $S_1$ 1318 or received paging signal $S_2$ 1320, and the second signal is control signal $S_8$ 1332. As another example, consider that the first node is communications device B 1404 of FIG. 14 and the second node is communications device A 1402 of FIG. 14, then the first signal is received peer discovery signal $S_1$ 1418 or received paging signal $S_2$ 1420, the second signal is control signal $S_8$ 1432, and the third signal is control signal $S_7$ 1430.

As another example, consider that the first node is communications device A 1302 and the second node is communications device B 1304, then the first signal is received peer discovery signal $S_5$ 1326, and the second signal is control signal $S_3$ 1322. As still another example, consider that the first node is communications device A 1402 and the second node is communications device B 1404, then the first signal is received peer discovery signal $S_5$ 1426 or received paging signal S6 1428, the second signal is control signal $S_4$ 1424, and the third signal is control signal $S_3$ 1422.

In some embodiments, the control signals ($S_3$, $S_4$, $S_7$, $S_8$) are useful for interference management and/or resource scheduling purposes, e.g., particularly useful in a peer to peer network implementing decentralized scheduling and/or managed air link resource re-usage. For example, the second and third signals transmitted by the first node implementing the method of flowchart 1500 of FIG. 15 may be, and sometimes are, used by other nodes seeking to establish a connection and evaluate whether a resource in use by the existing communications connection can be reused concurrently by a new connection.

In FIGS. 13 and 14, resource reuage has been described in the context of a connection identifier with associated air link resources. In general the methods and apparatus of various embodiments are also applicable to other resources, e.g., a traffic segment under contention.

Figure 16:
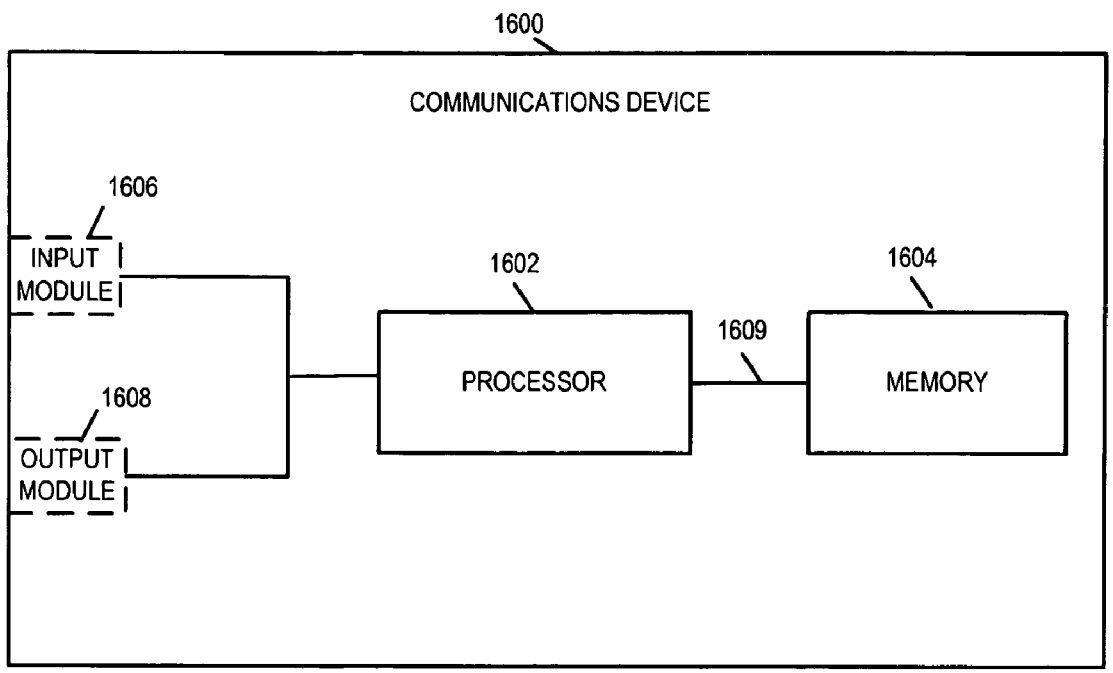
FIG. 16 is a drawing of an exemplary communications device in accordance with an exemplary embodiment.

FIG. 16 is a drawing of an exemplary communications device 1600 in accordance with an exemplary embodiment. Exemplary communications device 1600 is, e.g., one of communications device A 1302 of FIG. 13, communications device B 1304 of FIG. 13, communications device A 1402 of FIG. 14, and communications device B 1404 of FIG. 14. Communications device 1600 may be one of the exemplary peer to peer communications devices of network 100 of FIG. 1. Exemplary communications device 1600 implements a method in accordance with flowchart 1500 of FIG. 15.

Communications device 1600 includes a processor 1602 and memory 1604 coupled together via a bus 1609 over which the various elements (1602, 1604) may interchange data and information. Communications device 1600 further includes an input module 1606 and an output module 1608 which may be coupled to processor 1602 as shown. However, in some embodiments, the input module 1606 and output module 1608 are located internal to the processor 1602. Input module 1606 can receive input signals. Input module 1606 can, and in some embodiments does, include a wireless receiver and/or a wired or optical input interface for receiving input. Output module 1608 may include, and in some embodiments does include, a wireless transmitter and/or a wired or optical output interface for transmitting output.

Processor 1602 is configured to: receive a first signal from a second node; determine a first power level of the received first signal; and transmit a second signal at a second power level which has a predetermined relationship to the determined first power level. In some embodiments, said predetermined relationship is that said second power level is inversely proportional to the determined first power level.

The first signal is, in some embodiments, one of a peer discovery signal or a paging signal. In some embodiments, the first signal is transmitted on multiple tone-symbols, said first power level being an average per tone-symbol power level. In some such embodiments, said multiple tone-symbols include tone-symbols corresponding to different symbol transmission time periods.

The second signal, in various embodiments, is a single tone signal, e.g., a single tone OFDM signal communicated on a single OFDM tone-symbol. In some embodiments the single OFDM tone-symbol is part of a connection identifier broadcast block.

In some embodiments, processor 1602 is further configured to: establish a communications connection with said second node prior to transmitting said second signal. In various embodiments, processor 1602 is further configured to: transmit a third signal at a third power level. The third power level is, in some embodiments, a power level having a predetermined relationship to the first power level.

Figure 17:
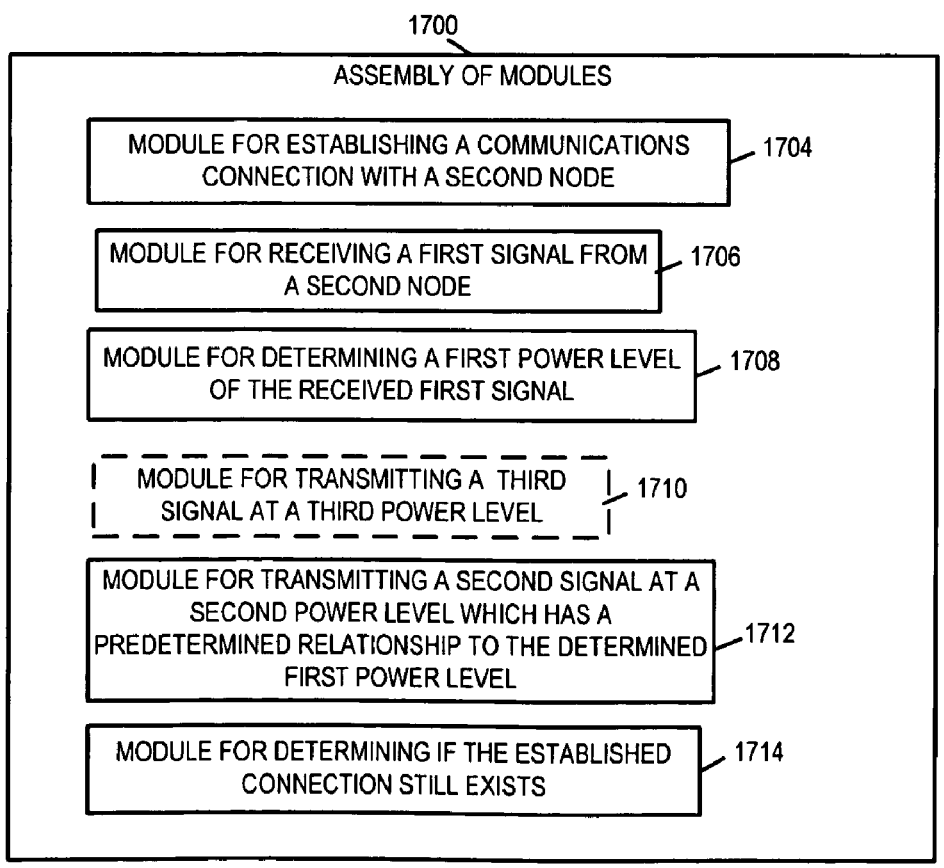
FIG. 17 is an assembly of modules which can, and in some embodiments are, used in the communications device illustrated in FIG. 16.

FIG. 17 is an assembly of modules 1700 which can be, and in some embodiments are, used in the communications device 1600 illustrated in FIG. 16. The modules in the assembly 1700 can be implemented in hardware within the processor 1602 of FIG. 16, e.g., as individual circuits. Alternatively, the modules may be implemented in software and stored in the memory 1604 of the communications device 1600 shown in FIG. 16. While shown in the FIG. 16 embodiment as a single processor, e.g., computer, it should be appreciated that the processor 1602 may be implemented as one or more processors, e.g., computers. When implemented in software the modules include code, which when executed by the processor, configure the processor, e.g., computer, 1602 to implement the function corresponding to the module. In embodiments where the assembly of modules 1700 is stored in the memory 1604, the memory 1604 is a computer program product comprising a computer readable medium comprising code, e.g., individual code for each module, for causing at least one computer, e.g., processor 1602, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 17 control and/or configure the communications device 1600 or elements therein such as the processor 1602, to perform the functions of the corresponding steps illustrated in the method flowchart 1500 of FIG. 15.

Assembly of modules 1700 includes: a module 1704 for establishing a communications connection with a second device prior to transmitting the second signal, a module 1706 for receiving a first signal from a second node, a module 1708 for determining a first power level of the received first signal, a module 1712 for transmitting a second signal at a second power level which has a predetermined relationship to the first power level, and a module 1714 for determining if the established connection still exists. In some embodiments, e.g., an embodiment supporting bi-directional resource reuse, assembly of modules 1700 further includes a module 1710 for transmitting a third signal at a third power level. In various embodiments, the third power level is a power level having a predetermined relationship to the first power level.

In some embodiments the predetermined relationship relating the second power level to the first power level is that the second power level is inversely proportional to the determined first power level. In some embodiments, the first power level is one of a peer discovery signal or a paging signal. In some such embodiments, the first signal is transmitted on multiple tone-symbols and the first power level is an average per tone-symbol power level. In some such embodiments, the multiple tone-symbols include tone-symbols corresponding to different symbol transmission time periods.

The second signal, in some embodiments, is a single tone signal, e.g., a single tone OFDM signal communicated on a single OFDM tone-symbol. The third signal in some embodiments, is a single tone signal, e.g., a single tone OFDM signal communicated on a single OFDM tone-symbol. In some embodiments, the second and third signals are communicated on different OFDM tone-symbols in a connection identifier transmission block, e.g., two different OFDM tone-symbols which map to the current connection of node 1600.

The techniques of various embodiments may be implemented using software, hardware and/or a combination of software and hardware. Various embodiments are directed to apparatus, e.g., relay stations, mobile nodes such as mobile access terminals, base stations including one or more attachment points, and/or communications systems. Various embodiments are also directed to methods, e.g., method of controlling and/or operating relay stations, mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, receiving a signal, determining a received power level power, estimating an SINR, making a resource reuse decision, determining a control signal transmission power level, and/or transmitting a control signal, etc. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals which may be mobile devices, base stations, and/or relay stations are configured to perform the steps of the methods described as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While described in the context of an OFDM system, at least some of the methods and apparatus of various embodiments are applicable to a wide range of communications systems including many non-OFDM and/or non-cellular systems. At least some of the methods and apparatus are applicable to hybrid systems, e.g. a system including OFDM and CDMA signaling techniques.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between mobile nodes, between mobile nodes and relay stations, between access nodes and mobile nodes, between access nodes and relay station, and/or between relay stations and mobile nodes. In some embodiments the access nodes are implemented as base stations which establish communications links with mobile nodes and/or relay stations using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A communications method implemented in a first node, the method comprising:
   receiving a first signal from a second node;
   determining a first power level of the received first signal; and
   transmitting a second signal at a second power level that is inversely proportional to the determined first power level.

2. The communications method of claim 1, further comprising:
   establishing a communications connection with said second node prior to transmitting said second signal.

3. The communications method of claim 1, further comprising:
   transmitting a third signal at a third power level.

4. The communications method of claim 3, wherein said third power level is a power level having a predetermined relationship to the first power level.

5. A first node comprising:
   at least one processor configured to:
      receive a first signal from a second node;
      determine a first power level of the received first signal; and
      transmit a second signal at a second power level which is inversely proportional to the determined first power level;
   and memory coupled to said at least one processor.

6. The first node of claim 5, wherein said at least one processor is further configured to:
   establishing a communications connection with said second node prior to transmitting said second signal.

7. The first node of claim 5, wherein said at least one processor is further configured to:
   transmit a third signal at a third power level.

8. A first node comprising:
   means for receiving a first signal from a second node;
   means for determining a first power level of the received first signal; and
   means for transmitting a second signal at a second power level which is inversely proportional to the determined first power level.

9. The first node of claim 8, further comprising:
   means for establishing a communications connection with said second node prior to transmitting said second signal.

10. The first node of claim 8, further comprising:
    means for transmitting a third signal at a third power level.

11. The first node of claim 8, wherein said third power level is a power level having a predetermined relationship to the first power level.

12. A computer program product for use in a first node, the computer program product comprising:
    a computer readable medium comprising:
       code for causing at least one computer to receive a first signal from a second node;
       code for causing said at least one computer to determine a first power level of the received first signal; and
       code for causing said at least one computer to transmit a second signal at a second power level that is inversely proportional to the determined first power level.

* * * * *